United States Patent
Chen et al.

(10) Patent No.: US 10,915,998 B2
(45) Date of Patent: Feb. 9, 2021

(54) IMAGE PROCESSING METHOD AND DEVICE

(71) Applicant: Huawei Technologies Co., Ltd., Shenzhen (CN)

(72) Inventors: Xin Chen, Shenzhen (CN); Wenmei Gao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 23 days.

(21) Appl. No.: 16/472,079

(22) PCT Filed: Dec. 21, 2016

(86) PCT No.: PCT/CN2016/111281
§ 371 (c)(1),
(2) Date: Jun. 20, 2019

(87) PCT Pub. No.: WO2018/112788
PCT Pub. Date: Jun. 28, 2018

(65) Prior Publication Data
US 2019/0385285 A1   Dec. 19, 2019

(51) Int. Cl.
*G06T 5/00* (2006.01)
*G06T 7/13* (2017.01)
(Continued)

(52) U.S. Cl.
CPC ............ *G06T 5/006* (2013.01); *G06K 9/3233* (2013.01); *G06K 9/4604* (2013.01); *G06T 7/13* (2017.01)

(58) Field of Classification Search
CPC . G06T 5/006; G06T 7/13; G06T 2207/30176; G06T 7/33; G06K 9/3233;
(Continued)

(56) References Cited

U.S. PATENT DOCUMENTS

| 7,106,898 B2* | 9/2006 | Bouguet ............ G01B 11/2504 382/154 |
| 7,171,056 B2 | 1/2007 | Zhang et al. |

(Continued)

FOREIGN PATENT DOCUMENTS

| CN | 101477687 A | 7/2009 |
| CN | 101989349 A | 3/2011 |

(Continued)

OTHER PUBLICATIONS

Machine Translation and Abstract of Chinese Publication No. CN101477687, Jul. 8, 2009, 9 pages.
(Continued)

*Primary Examiner* — Xuemei G Chen
(74) *Attorney, Agent, or Firm* — Conley Rose, P.C.

(57) ABSTRACT

In a rectangular region detection mechanism, a to-be-processed image information is received, where the to-be-processed image information comprises at least two images, and where the at least two images comprise a same plurality of first feature points. A plurality of first edge line segments in one of the at least two images are detected. Four first edge line segments from the plurality of first edge line segments are determined. Locations of photographed points corresponding to the plurality of first feature points in a region formed by the four first edge line segments are determined based on location information of the plurality of first feature points. The region is determined as a rectangular region when the photographed points corresponding to the plurality of first feature points in the region are coplanar.

20 Claims, 14 Drawing Sheets

(51) Int. Cl.
*G06K 9/32* (2006.01)
*G06K 9/46* (2006.01)

(58) Field of Classification Search
CPC . G06K 9/4604; G06K 2009/363; G06K 9/033
See application file for complete search history.

(56) References Cited

U.S. PATENT DOCUMENTS

| | | | |
|---|---|---|---|
| 7,399,086 B2* | 7/2008 | Huewel | G03B 21/14 353/69 |
| 7,486,310 B2* | 2/2009 | Sakurai | G06K 9/3283 348/207.99 |
| 8,373,107 B2 | 2/2013 | Meyers et al. | |
| 8,502,875 B2* | 8/2013 | Matsuda | H04N 1/00188 348/207.2 |
| 9,160,946 B1* | 10/2015 | Semenov | H04N 5/23222 |
| 9,242,494 B2* | 1/2016 | Nakamura | B41J 3/407 |
| 9,691,163 B2* | 6/2017 | Wexler | G06T 7/62 |
| 9,799,119 B2* | 10/2017 | Cheng | G06K 9/3233 |
| 10,192,133 B2* | 1/2019 | Yang | G02B 27/017 |
| 10,311,576 B2* | 6/2019 | Yamaguchi | G06T 7/13 |
| 2005/0213846 A1 | 9/2005 | Matsuda et al. | |
| 2011/0025860 A1* | 2/2011 | Katougi | G06T 3/4069 348/207.2 |
| 2014/0294303 A1 | 10/2014 | Kawatani et al. | |
| 2014/0340529 A1* | 11/2014 | Shibata | H04N 5/74 348/189 |
| 2015/0278594 A1* | 10/2015 | Copsey | G06K 9/00912 382/112 |
| 2017/0026546 A1* | 1/2017 | Ito | H04N 1/3873 |
| 2017/0083762 A1* | 3/2017 | Segalovitz | G06K 9/00463 |
| 2017/0249745 A1* | 8/2017 | Fiala | G02B 27/0093 |
| 2019/0356861 A1* | 11/2019 | Li | H04N 1/3873 |
| 2020/0098133 A1* | 3/2020 | Chen | G06T 7/33 |

FOREIGN PATENT DOCUMENTS

| | | |
|---|---|---|
| CN | 102842035 A | 12/2012 |
| CN | 102855619 A | 1/2013 |
| CN | 103077521 A | 5/2013 |
| CN | 103759677 A | 4/2014 |
| CN | 103996190 A | 8/2014 |
| CN | 104079750 A | 10/2014 |
| CN | 106210504 A | 12/2016 |
| EP | 2157545 A1 | 2/2010 |

OTHER PUBLICATIONS

Machine Translation and Abstract of Chinese Publication No. CN102842035, Dec. 26, 2012, 22 pages.
Machine Translation and Abstract of Chinese Publication No. CN102855619, Jan. 2, 2013, 22 pages.
Zhang, Z., "Single-View Geometry of a Rectangle With Application to Whiteboard Image Rectification," 2013, 7 pages.
Foreign Communication From a Counterpart Application, PCT Application No. PCT/CN2016/111281, English Translation of International Search Report dated Sep. 21, 2017, 2 pages.
Foreign Communication From a Counterpart Application, PCT Application No. PCT/CN2016/111281, English Translation of Written Opinion dated Sep. 21, 2017, 4 pages.
Liu, Y., et al., "Change Area Detect ion on Photograph Using VirtuoZo" 2000, 7 pages.
You, J., et al., "Fast and Easy Method of Automatic Camera Calibration," 3rd International Conference on Materials Engineering, Manufacturing Technology and Control (ICMEMTC 2016), 7 pages.
Wang, H., "Image Feature Detection and Application for Two Targets" Mar. 15, 2008, 165 pages.

* cited by examiner

IMAGE PROCESSING METHOD AND DEVICE

CROSS-REFERENCE TO RELATED APPLICATIONS

This application is a U.S. National Stage of International Application No. PCT/CN2016/111281, filed on Dec. 21, 2016, which is hereby incorporated by reference in its entirety.

TECHNICAL FIELD

Embodiments of the present invention relate to the field of image processing technologies, and in particular, to an image processing method and device.

BACKGROUND

With continuous development of science and technologies, more intelligent devices such as smartphones and tablet computers are used in daily life. These intelligent devices usually have camera lenses. With continuously enhancement of photographing technologies, these intelligent devices can photograph and record slides, whiteboards, billboards, and the like at any time, and determine useful information in recorded images based on the images. This convenient and quick information recording manner becomes increasingly popular among people.

However, a camera lens captures an image on which a projection transform has been performed. Therefore, a photographed real world is distorted in the image. This case is particularly obvious at a far end of a rectangular frame photographed by using the camera lens. The far end is a side of the rectangular frame that is relatively far away from the camera lens or an angle between two sides relatively far away from the camera lens. This distorted image makes a reader unable to effectively obtain information in the image. A method for resolving the problem in the prior art is a detecting a quadrangle in the image; estimating, based on a preset angle threshold between neighboring sides, a preset angle threshold between opposite sides, and a preset threshold of a ratio between a perimeter of the quadrangle and a perimeter of the image, whether the quadrangle is actually a rectangle, and then performing correction. However, the information in the image is distorted information. Therefore, an erroneous-determining rate is high when determining is performed based on the information.

SUMMARY

Embodiments of the present invention provide an image processing method and device. According to the embodiments of the present invention, when rectangular region detection is performed, a rectangular region in an image is detected based on information that is in three-dimensional space and that corresponds to the image. The information in the three-dimensional space is more real and accurate than information in a two-dimensional image. Therefore, accuracy is higher when the rectangular region detection is performed based on the information in the three-dimensional space, thereby improving user experience.

According to an aspect, an embodiment of the present invention provides a rectangular region detection method. The method specifically includes: determining to-be-processed image information, where the to-be-processed image information includes at least two images (for example, a plurality of images captured by using a binocular camera or a multi-ocular camera), and the at least two images include a same plurality of first feature points; detecting a plurality of first edge line segments in one of the at least two images; determining four first edge line segments in the plurality of first edge line segments; determining, based on location information of a plurality of first feature points in a region formed by the four first edge line segments in the at least two images, locations of photographed points corresponding to the plurality of first feature points in the region, where the plurality of first feature points in the region include four vertexes of a quadrangle formed by the four first edge line segments; and determining, when the photographed points corresponding to the plurality of first feature points in the region are coplanar, that the region is a rectangular region. According to this embodiment of the present invention, when the rectangular region detection is performed, it is determined whether the photographed points corresponding to the feature points in the region formed by the edge line segments are coplanar, to determine whether the region formed by the four first edge line segments is a plane in three-dimensional space. Only when the region is a plane, the four first edge line segments may be edge line segments of the rectangular region, thereby reducing an erroneous-determining rate, and improving user experience.

In a possible implementation, the determining, based on location information of a plurality of first feature points in a region formed by the four first edge line segments in the at least two images, locations of photographed points corresponding to the plurality of first feature points in the region specifically includes: calculating, based on two-dimensional coordinates (the location information) of the plurality of first feature points in the region formed by the four first edge line segments in the at least two images, coordinates of second feature points corresponding to the first feature points in the region in a first three-dimensional coordinate system (for example, a photographing device coordinate system, also referred to as a camera coordinate system). For example, a bundle adjustment method may be used for calculation. According to this embodiment of the present invention, locations of the feature points in different images may be traced, to estimate locations of the feature points in the three-dimensional space, and it is determined, based on the locations, whether the feature points are coplanar, thereby reducing a possibility of erroneous determining.

It should be noted that, the first three-dimensional coordinate system is a camera coordinate system, and an origin of the coordinate system is a location of an optical center of a camera. A second three-dimensional coordinate system is a plane three-dimensional coordinate system. Two of three coordinate axes of the second three-dimensional coordinate system are coplanar with the plurality of second feature points. Alternatively, a plane defined by two of three coordinate axes of the second three-dimensional coordinate system is parallel to a plane defined by the plurality of second feature points.

In a possible implementation, before the region formed by the four first edge line segments is determined as a rectangular region, it may be determined whether a region formed by four second edge line segments corresponding to the four first edge line segments is a rectangle. Specifically, the method may include: calculating a transformation matrix from a two-dimensional coordinate system of an image plane of the one of the at least two images to a second three-dimensional coordinate system based on the coordinates of the plurality of second feature points in the region formed by the four first edge line segments in the first three-dimensional coordinate system; and calculating, based on the transformation matrix, four second edge line segments in the second three-dimensional coordinate system that correspond to the four first edge line segments. In the second three-dimensional coordinate system, locations of photographed edge line segments corresponding to the first edge line segments are described by using the second edge line segments. When a shape formed by the four second edge line segments is a rectangle, the region formed by the first edge line segments is determined as a rectangular region. In this embodiment of the present invention, it is determined, based on the second edge line segments corresponding to the four first edge line segments and rectangle geometric characteristics such as parallelism, an angle, and a distance between the four second edge line segments, whether the shape formed by the four first edge line segments is a rectangle. The second edge line segments are line segments in the three-dimensional space, and there is no distortion in the three-dimensional space. Therefore, a possibility of erroneous determining of the rectangular region is reduced, and user experience is improved.

According to a second aspect, an embodiment of the present invention provides an image processing method. The method includes: determining a to-be-processed image, where the to-be-processed image includes at least two images (for example, at least two images captured by using a binocular camera or a multi-ocular camera), and the at least two images include a same plurality of first feature points; selecting four first edge line segments satisfying a preset rule (for the preliminary determining) from one (which may be any one) of the at least two images, and calculating, based on two-dimensional coordinates of a plurality of first feature points in a region formed by the four first edge line segments in the at least two images, coordinates of second feature points corresponding to the first feature points in the region in a first three-dimensional coordinate system (for example, a photographing device coordinate system), where in the first three-dimensional coordinate system, locations of photographed points corresponding to first feature points are described by using the second feature points; calculating a transformation matrix from a two-dimensional coordinate system of an image plane of the one of the at least two images to a second three-dimensional coordinate system based on coordinates of the plurality of second feature points in the second three-dimensional coordinate system; and calculating, based on the transformation matrix, four second edge line segments in the second three-dimensional coordinate system that correspond to the four first edge line segments. In the second three-dimensional coordinate system locations of photographed edge line segments corresponding to the first edge line segments are described by using the second edge line segments. When a shape formed by the four second edge line segments is a rectangle, one of the at least two images is corrected. For example, an aspect ratio of the shape formed by the four second edge lines is determined based on the four second edge line segments, and any one of the at least two images is corrected based on the aspect ratio. In this embodiment of the present invention, edge line segments in three-dimensional space that correspond to the edge line segments in the image are calculated, and the image is corrected based on a relationship between a length and a width of the rectangle formed by the edge line segments in the three-dimensional space, so that the corrected image is more approximate to a shape of a photographed object, the corrected image is more real, and user experience is better.

In an optional implementation, the preset rule (for preliminary determining) may include: screening a plurality of first edge line segments, and selecting first edge line segments whose lengths satisfy a requirement. Further, first edge line segments whose lengths are relatively long and that account for a proportion may be selected from the plurality of first edge line segments. Alternatively, it is determined whether the region formed by the four first edge line segments is sufficiently large.

In another optional implementation, when the shape formed by the four second edge lines is a rectangle, one or more of the following conditions need to be satisfied: an angle between directions of two opposite edge line segments in the four second edge line segments is less than a first threshold; an absolute value of a difference between a distance between two opposite edge line segments in the four second edge line segments and the other two edge line segments needs to be less than a second threshold; an angle between two neighboring edge line segments in the four second edge line segments is less than a third threshold; an absolute value of a difference between lengths of two opposite edge line segments in the four second edge line segments needs to be less than a fourth threshold; and the plurality of second feature points in the three-dimensional coordinate system that correspond to the first feature points in a region formed by the four second edge line segments are coplanar. According to this embodiment of the present invention, edge line segments of a rectangle may be determined in a plurality of edge line segments in the image plane, and an aspect ratio of a corrected rectangular frame image may be most approximate to an actual aspect ratio by correcting the rectangle, thereby reducing distortion and improving user experience.

In a possible design, before one of the at least two images is corrected based on the four first edge line segments and the four second edge line segments, the method further includes: determining whether the shape formed by the four second edge line segments is a rectangle. According to this embodiment of the present invention, rectangle geometric characteristics such as parallelism, an angle, and a distance between four sides in the three-dimensional space that are obtained through mapping from a two-dimensional plane may be determined, to determine whether a quadrangle formed by the four second edge line segments is a rectangle. The second edge line segments are undistorted. Therefore, a determining result is more accurate.

According to a third aspect, an embodiment of the present invention provides a rectangular region detection apparatus. The apparatus can implement steps in the method according to the first aspect and the optional implementations. The apparatus may be implemented by using hardware, or may be implemented by hardware executing corresponding software. The hardware or software includes one or more modules corresponding to the foregoing functions.

According to a fourth aspect, an embodiment of the present invention provides an image processing apparatus. The apparatus can implement steps in the method according to the second aspect and the optional implementations. The apparatus may be implemented by using hardware, or may be implemented by hardware executing corresponding software. The hardware or software includes one or more modules corresponding to the foregoing functions.

According to a fifth aspect, an embodiment of the present invention provides a rectangular region detection device. The device includes: at least one camera lens, configured to determine to-be-processed image information, where the to-be-processed image information includes at least two images, and the at least two images include a same plurality of first feature points; and a processor, configured to detect a plurality of first edge line segments in one of the at least two images. The processor is further configured to determine four first edge line segments in the plurality of first edge line segments. The processor is further configured to determine, based on location information of a plurality of first feature points in a region formed by the four first edge line segments in the at least two images, locations of photographed points corresponding to the plurality of first feature points in the region. The processor is further configured to determine, when the photographed points corresponding to the plurality of first feature points in the region are coplanar, that the region is a rectangular region.

In a possible design, the processor is further configured to calculate, based on two-dimensional coordinates of the plurality of first feature points in the region in the at least two images, coordinates of second feature points corresponding to the plurality of first feature points in a first three-dimensional coordinate system.

In another possible design, the processor is further configured to construct a second three-dimensional coordinate system based on the coordinates of the plurality of second feature points in the first three-dimensional coordinate system, and calculate coordinates of the plurality of second feature points in the second three-dimensional coordinate system and calculate a transformation matrix from a two-dimensional coordinate system of an image plane of the one of the at least two images to the second three-dimensional coordinate system. Two of three coordinate axes of the second three-dimensional coordinate system are coplanar with the plurality of second feature points. Alternatively, a plane defined by two of three coordinate axes of the second three-dimensional coordinate system is parallel to a plane defined by the plurality of second feature points.

The processor is further configured to calculate, based on the transformation matrix, four second edge line segments in the second three-dimensional coordinate system that correspond to the four first edge line segments.

The processor is further configured to determine, when a shape formed by the four second edge lines is a rectangle, that the region is a rectangular region.

In still another possible design, the plurality of first feature points in the region include four vertexes of a quadrangle formed by the four first edge line segments.

According to a sixth aspect, an embodiment of the present invention provides an image processing device. The device includes: at least one camera lens, configured to determine a to-be-processed image, where the to-be-processed image includes at least two images, and the at least two images include a same plurality of first feature points; and a processor, configured to: detect a plurality of first edge line segments in one of the at least two images, select four first edge line segments satisfying a preset rule from the one of the at least two images, calculate, based on two-dimensional coordinates of a plurality of first feature points in a region formed by the four first edge line segments in the at least two images, coordinates of second feature points corresponding to the first feature points in the region in a first three-dimensional coordinate system, construct a second three-dimensional coordinate system based on the coordinates of the plurality of second feature points, calculate coordinates of the plurality of second feature points in the second three-dimensional coordinate system, and calculate the coordinates of the plurality of second feature points in the second three-dimensional coordinate system and calculate a transformation matrix from a two-dimensional coordinate system of an image plane of the one of the at least two images to the second three-dimensional coordinate system. Two of three coordinate axes of the second three-dimensional coordinate system are coplanar with the plurality of second feature points. Alternatively, a plane defined by two of three coordinate axes of the second three-dimensional coordinate system is parallel to a plane defined by the plurality of second feature points. The processor is further configured to calculate, based on the transformation matrix, four second edge line segments in the second three-dimensional coordinate system that correspond to the four first edge line segments. The processor is further configured to correct one of the at least two images when a shape formed by the four second edge lines is a rectangle.

In a possible design, the processor is further configured to correct one of the at least two images based on an aspect ratio of the shape formed by the four second edge line segments.

In a possible design, the shape formed by the four second edge lines is a rectangle when one or more of the following conditions are satisfied: an angle between directions of two opposite edge line segments in the four second edge line segments is less than a first threshold; a distance between two opposite edge line segments in the four second edge line segments needs to be greater than a second threshold; an angle between two neighboring edge line segments in the four second edge line segments is less than a third threshold; a perimeter or an area of a region formed by the four second edge line segments is greater than a fourth threshold; and the plurality of second feature points are coplanar.

According to a seventh aspect, an embodiment of the present invention provides a computer storage medium, configured to store a computer software instruction used by the foregoing rectangular region detection device. The computer software instruction includes a program designed to perform the first aspect and the optional implementations.

According to an eighth aspect, an embodiment of the present invention provides a computer storage medium, configured to store a computer software instruction used by the foregoing image processing device. The computer software instruction includes a program designed to perform the second aspect and the optional implementations.

These and other aspects of the present invention will be clearer and easier to understand in descriptions of the following embodiments.

DESCRIPTION OF EMBODIMENTS

Figure 1:
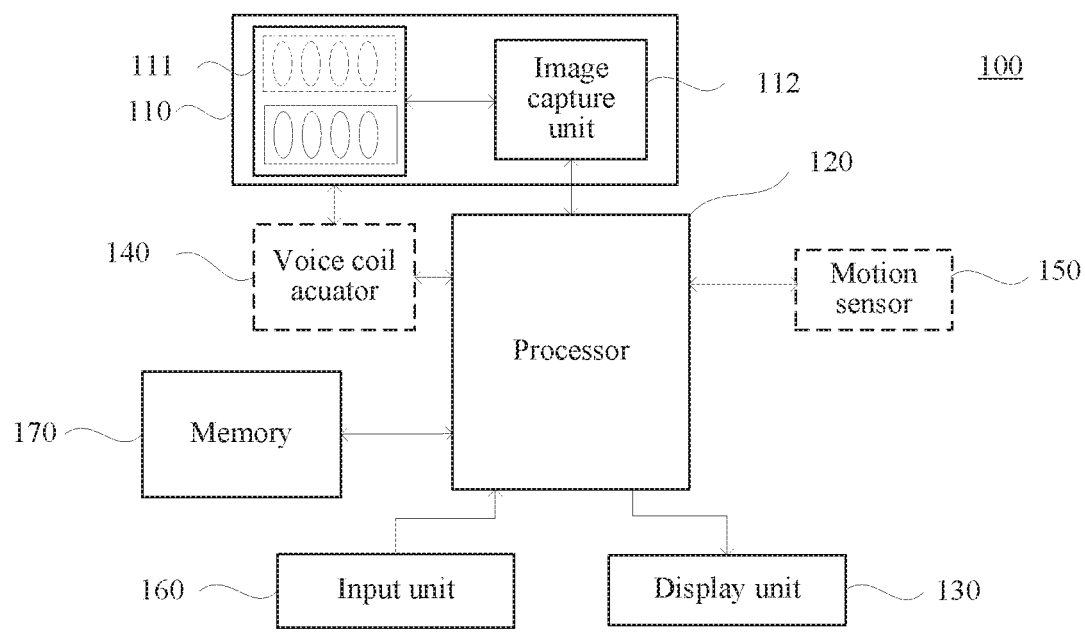
FIG. 1 is a structural block diagram of a photographing device according to an embodiment of the present invention.

It should be noted that in the embodiments of the present invention, a "first three-dimensional coordinate system" is a camera coordinate system, and an origin of the coordinate system is a location of an optical center of a camera.

A "second three-dimensional coordinate system" is a plane three-dimensional coordinate system. A plane defined by two of three coordinate axes of the second three-dimensional coordinate system is parallel to or coplanar with a plane of a rectangular region in three-dimensional space.

A "photographed point" is a point in reality that is photographed by a photographing device.

A "first feature point" is a feature point in an image. Points, for example, a corner (Corner) of a rectangular frame in the image, that are located in a region having a severe grayscale change and that are relatively easy both to be separate from surrounding pixel points and to be detected are usually selected. These points may be usually described by using a feature descriptor (Feature Descriptor) calculated by using a point in a surrounding region. A relatively common feature descriptor is, for example, a SIFT (scale-invariant feature transform), SURF (Speeded Up Robust Features), or a HoG (histogram of oriented gradient). The feature descriptor is usually a vector.

A "second feature point" is a photographed point corresponding to the first feature point.

A "first edge line segment" is an edge line segment in the image. A point whose grayscale value has a relatively large difference from that of a surrounding pixel in the image is usually located in an edge region in the image, and each edge in the image includes such points located at the edge. A common edge detection algorithm includes Canny, Sobel, Prewitt, and the like.

A "second edge line segment" is a line segment corresponding to the first edge line segment in the second three-dimensional coordinate system. To be specific, the second three-dimensional coordinate system is used to describe an expression of a location of a photographed edge line segment corresponding to the first edge line segment in the three-dimensional space.

"Correction" means adjusting a distorted image through a perspective transform (Perspective Transform), and in the embodiments of the present invention, usually means adjusting an image in a rectangular region in an image plane.

According to an image processing method and device provided in the present invention, a location of a photographed point corresponding to a feature point may be determined through feature point tracing based on locations of the feature point in different images. Information that is in the three-dimensional space and that corresponds to the image may be determined based on the location of the photographed point, and rectangular region detection is performed based on the information in the three-dimensional space, so that accuracy is higher, and user experience is improved. The rectangular region detection may be performed based on the information in the three-dimensional space in one of or a combination of the following manners:

Manner one: It is determined whether photographed points corresponding to feature points in a region formed by edge line segments are coplanar.

Manner two: Four first edge line segments of a quadrangle that are detected in a two-dimensional plane may be transformed into the three-dimensional space through estimation of a camera pose, and the rectangular region detection is performed based on rectangle geometric characteristics such as parallelism, an angle, and a distance between edge line segments in the three-dimensional space. Information in the three-dimensional space is undistorted. Therefore, detection accuracy is higher.

In addition, a rectangular region detected in the foregoing manner may be corrected at least in the following manner:

Manner three: The rectangular region in the image may further be corrected based on a feature of a rectangle that is in the three-dimensional space and that corresponds to the rectangular region in the image. Similarly, the information in the three-dimensional space is undistorted. Therefore, a distortion rate can be reduced by correcting the rectangular region in the image based on the information in the three-dimensional space.

A device implementing solutions in the present invention mainly includes a photographing function and a processing function. The two functions may be integrated into one device, for example, a digital camera, a mobile phone having the photographing function, or a notebook computer integrated with a camera lens. Alternatively, two devices respectively having the photographing function and the processing function may be used. For example, an image captured by using a digital camera may be processed by a computer (for example, a personal computer (English: personal computer, PC)); or a computer may implement the photographing function by using an external camera lens.

In the present invention, the photographing function mainly includes capture of an image and collection of some parameters (for example, a focal length and photographing location information) during photographing. It should be noted that, some parameters during the photographing further include some parameters inherent to a system. Operations such as obtaining and calculation of these parameters are mainly completed by a module having the processing function.

The processing function mainly includes feature point tracing, pose estimation (English: Pose Estimation), detection of an edge line segment, transformation between three-dimensional coordinates and two-dimensional coordinates, correction of an image, and the like, and may further include some control functions.

FIG. 1 is a structural block diagram of a photographing device according to an embodiment of the present invention.

A photographing device 100 includes: a camera lens 110, mainly for implementing a photographing function, where the camera lens has an optical unit 111 into which light from an imaging object (a photographed object) is input and an image capture unit 112 that is disposed behind an optical axis of the optical unit 111 and that photographs the imaging object by using the optical unit 111: and a processor 120, mainly for implementing a processing function, including image processing and overall control. The photographing device 100 may further include a display unit 130, configured to output an image processed by the processor 120.

In an embodiment, the photographing device 100 may include a voice coil acuator 140. The processor 120 may drive, by using the voice coil acuator 140, the camera lens 110 to move by a specified angle and/or for a specified displacement, to capture a plurality of images having different angles of view.

In another embodiment, the photographing device 100 may include at least two camera lenses. Alternatively, the camera lens 110 may include at least two optical units 111. The photographing device 100 may capture, at a time by using the at least two camera lenses or the at least two optical units 111, at least two images having different angles of view: For the at least two images having different angles of view, angles of and/or a distance between the at least two camera lenses may be calculated by using the processor 120: or angles of and/or a distance between the at least two camera lenses may be set to a fixed parameter during manufacture of the photographing device 100.

The optical unit 111 may further include a zoom lens, a correction lens, a diaphragm (English: diaphragm) mechanism, a focusing lens, and the like. The zoom lens may move in an optical axis direction by using a zoom motor, and the focusing lens may move in the optical axis direction by using a focusing motor. Further, the correction lens may be controlled by using a correction lens motor, so that an angle between incident light and an image capture surface is always approximately constant. A diaphragm of the diaphragm mechanism may further be controlled by using an iris (English: iris) motor.

In addition, the processor 120 may control the foregoing various motors by using an electric drive.

The image capture assembly 112 may include: a charge coupled device (English: Charged Coupled Device, CCD) image sensor, for generating an image signal of the photographed object based on light from the optical unit 111: a correlated double sampling (English: Correlated Double Sampling, CDS) circuit, for implementing related double sampling processing, where a noise part included in the image signal read by the CCD image sensor is eliminated through the processing; an analog to digital (English: analog to digital converter, A/D) converter, for converting an analog signal processed by the CDS circuit into a digital signal; a timing signal generator (English: timinggenerator, TG), for generating a timing signal for driving the CCD image sensor; and the like.

The processor 120 has various circuits, connected to each other via a main line. Specifically, the processor 120 may include: an image input control circuit, for applying image data from the A/D converter to the main line; an image processing circuit, for implementing pre-determined digital signal processing based on the input image data; a video random access memory (English: Video Random Access Memory, VRAM), configured to store to-be-displayed image data indicating an image; and a display control circuit, for controlling an image displayed on the display unit. The image is based on the image data stored in the VRAM.

The display unit 130 may be configured to display information entered by a user or information provided for a user, and various menus of the photographing device 100. The display unit 130 may include a display panel. Optionally, the display panel may be configured in a form of a liquid crystal display (English: Liquid Crystal Display, LCD), an organic light-emitting diode (English: Organic Light-Emitting Diode, OLED), or the like. Further, a touch panel may cover the display panel. After detecting a touch operation on or near the touch panel, the touch panel transfers the touch operation to the processor 130, to determine a type of a touch event. Then, the processor 120 provides a corresponding visual output on the display panel based on the type of the touch event. In some embodiments, the touch panel and the display panel may be integrated to implement input and output functions.

In this embodiment of the present invention, the processor 120 performs rectangular region detection on at least two images captured by using the camera lens 110. A detected rectangular region may be prominently displayed by using the display unit 130, to help to prompt the user. For example, an edge of the detected rectangular region may be identified by using a highlighted line segment, or the detected rectangular region may be displayed in a highlighted manner. The user may confirm the detected rectangular region by using the touch panel. For example, a reference area on an image inside the rectangular region may be added by using the touch panel (where the user directly touches the rectangular region on the display unit 130), or a reference area on an image outside the rectangular region may be deleted by using the touch panel.

It should be noted that, the processor 120 may directly perform rectangular region detection on at least two images. The at least two images may be pre-captured by using the photographing device, or may be captured by using another photographing device (w here the photographing function and the processing function are respectively implemented by two devices).

In an embodiment, the photographing device 100 may further include a motion sensor 150, an input unit 160, and a memory 170. The motion sensor 150 is configured to measure a rotation angle, a displacement parameter, and the like of the photographing device 100.

The input unit 160 may be configured to receive input digit or character information, and generate a key signal input related to user setting and function control of the photographing device 100. Specifically, the input unit 160 may include a touch panel and another input device. The touch panel, also referred to as a touchscreen, may collect a touch operation of a user on or near the touch panel (such as an operation of the user on or near the touch panel by using any suitable object or accessory such as a finger or a stylus), and drive a corresponding connection apparatus based on a preset program. In addition to the touch panel, the input unit 160 may further include the another input device. Specifically, the another input device may include, but is not limited to, one or more of a physical keyboard, a function key (for example, a shutter button or a power on/off button), a trackball, a joystick, and the like.

The memory 170 may be configured to store a software program and a module, and the processor 120 runs the software program and the module that are stored in the memory 170, to perform various functional applications of the photographing device 100 and data processing. The memory 170 may mainly include a program storage area and a data storage area. The program storage area may store an operating system, a program required by at least one function (such as an image preview function, an image search function, an image capture function, and an image processing function), and the like. The data storage area may store data (such as video data and a picture) created based on use of the photographing device 100, and the like. In addition, the memory 170 may include a high speed random access memory, and may further include a nonvolatile memory, such as at least one magnetic disk storage device, a flash memory device, or another volatile solid-state storage device.

Figure 2:
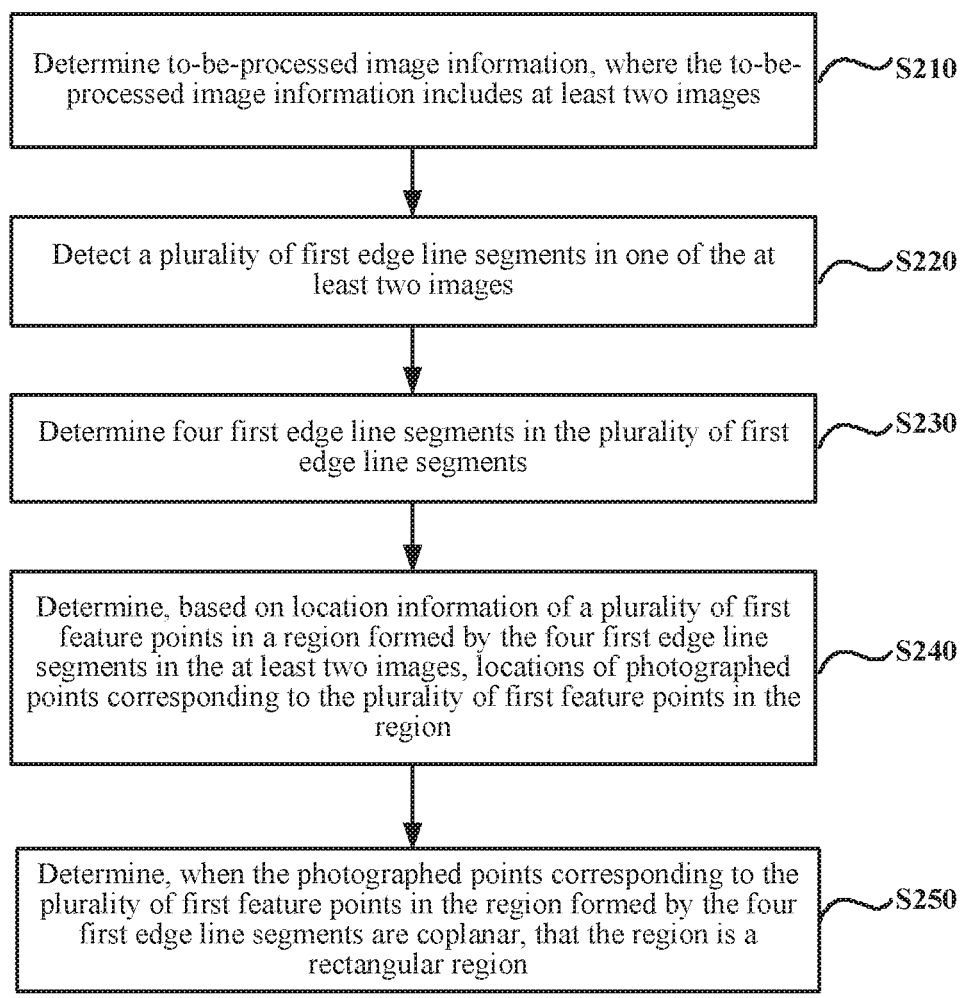
FIG. 2 is a flowchart of a rectangular region detection method according to an embodiment of the present invention.

FIG. 2 is a flowchart of a rectangular region detection method according to an embodiment of the present invention. As shown in FIG. 2, usually, a rectangular region is a plane in reality, for example, a whiteboard or a projection on a slide. In the method, actual locations of photographed points corresponding to feature points in an image region are determined, and it is determined, based on the actual locations of the photographed points, whether the photographed points are coplanar. When the photographed points corresponding to the feature points in the image area are coplanar, the entire region is considered as a plane. Specifically, the following steps are included.

S210: Determine to-be-processed image information, where the to-be-processed image information includes at least two images, and the at least two images include a same plurality of first feature points.

Two images may be captured by using a binocular (where "ocular" refers to a camera lens or an optical unit) photographing device, and a plurality of images may be captured by using a multi-ocular photographing device. For the binocular photographing device or the multi-ocular photographing device, a distance between the camera lenses or the optical units and an angle between optical axes of the camera lenses or the optical units may be preset or specified (where if the camera lenses or the optical units may be adjusted, a maximum value and a minimum value usually exist, and any distance or angle may be specified within this range). Alternatively, at least two images having different photographing angles and/or local lengths are captured at a same photographing location by using a photographing device having a voice coil acuator. Alternatively, a plurality of images may be captured by using a monocular photographing device at a plurality of angles. For example, at least two images having different photographing angles and/or local lengths are captured by using the photographing device at different photographing locations, and a rotation angle and/or locations of the photographing device during photographing of one image to another image in a photographing process are recorded by using a motion sensor, to ensure different photographing angles of view.

It should further be noted that, when a plurality of feature points are determined, points, for example, a corner (Corner) of a rectangular frame in an image, that are located in a region having a severe grayscale change and that are relatively easy both to be separate from surrounding pixel points and to be detected are usually selected. These points may be usually described by using a feature descriptor (Feature Descriptor) calculated by using a point in a surrounding region. A relatively common feature descriptor is, for example, a SIFT (Scale Invariant Feature Transform, scale-invariant feature transform). SURF (Speeded Up Robust Features, speeded up robust features), or a HoG (Histogram of Gradient, histogram of oriented gradient). The feature descriptor is usually a vector. In addition, a to-be-detected object is usually a whiteboard, a projection on a slide, or the like, to be specific, a to-be-detected plane has content. Therefore, a point, for example, text or a point in a picture, that is in a region having a severe grayscale change in the content may be selected.

S220: Detect a plurality of first edge line segments in one of the at least two images.

A point whose grayscale value has a relatively large difference from that of a surrounding pixel in the image is usually located in an edge region in the image, and each edge in the image includes such points located at the edge. A common edge detection algorithm includes Canny, Sobel, Prewitt, and the like.

For an image including a rectangular region, there are at least four first edge line segments in the image. Due to a complex photographing environment, there are some other first edge line segments, for example, an edge of a shadow, an edge of another object, and a pattern in the rectangular region. During edge detection, all possible first edge line segments may be detected and then screened.

Figure 3A:
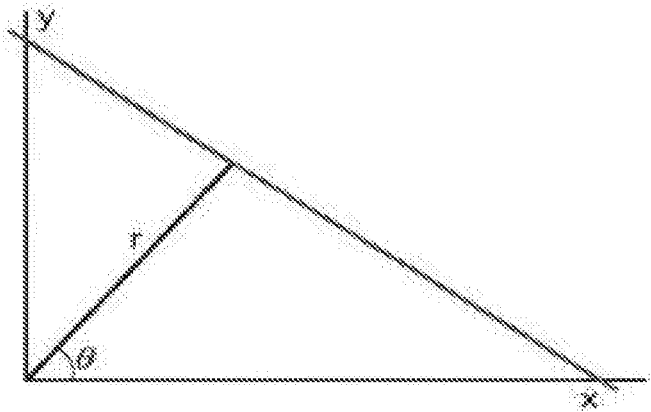
FIG. 3A shows a straight line indicated by using (r, θ) in a Cartesian coordinate system.
Figure 3B:
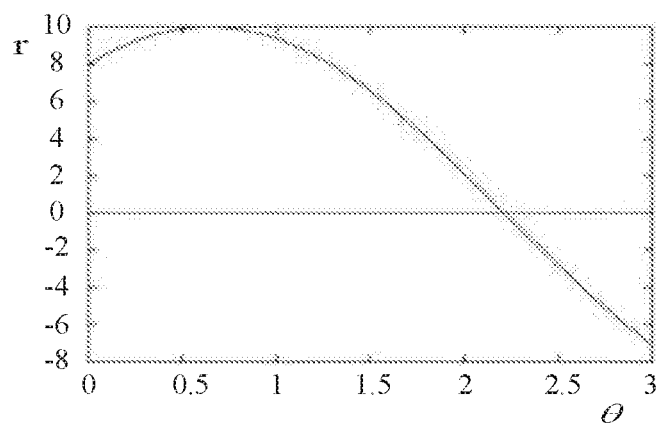
FIG. 3B shows a curve that is in (r, θ) space and that corresponds to any point on a straight line indicated by using (r, θ) in a Cartesian coordinate system.
Figure 3C:
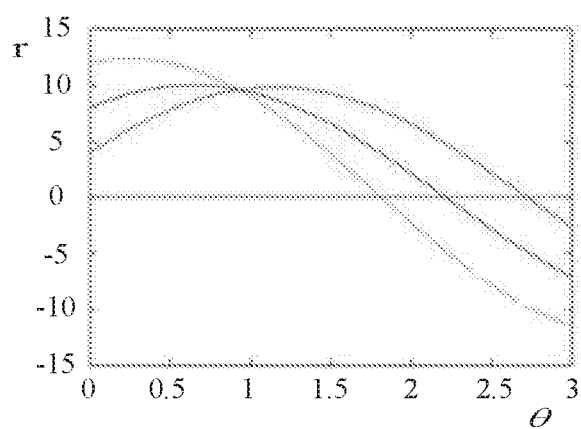
FIG. 3C shows an intersecting point between curves in (r, θ) space that correspond to a plurality of points on a straight line indicated by using (r, θ) in a Cartesian coordinate system.

In an example, FIG. 3A to FIG. 3C show an edge line detection method according to an embodiment of the present invention. Details are as follows:

FIG. 3A shows a Cartesian coordinate system, namely, an xy-coordinate system. For any straight line, a straight line perpendicular to the straight line is drawn starting from an origin. Assuming that a distance between the origin and the straight line is r and an angle between the perpendicular line and an x-axis is θ, a relationship between any point (x, y) on the straight line and (r, θ) is shown in a formula (1):

$$r = x \cos \theta + y \sin \theta \quad (1).$$

A Hough transform is performed on an edge line segment to obtain a curve, shown in FIG. 3B, that is in (r, θ) space and that corresponds to any point (x, y) on the straight line in the Cartesian coordinate system. Several curves in the (r, θ) space that correspond to points on the same straight line in the Cartesian coordinate system intersect at a point, as shown in FIG. 3C. Therefore, a straight line in the Cartesian coordinate system corresponds to a point in the (r, θ) space.

The intersecting point among the plurality of curves shown in FIG. 3C is calculated. For each intersecting point, a quantity of curves intersecting at the point is denoted as N. A larger value of N indicates a longer corresponding line segment in the Cartesian coordinate system.

It should be noted that the foregoing straight line detection method performed through the Hough transform is only one of a plurality of detection methods, and a method such as linear fitting may alternatively be used for implementation. In addition, in an actual application, due to impact of factors such as noise and a detection error, an intersecting point between curves in the (r, θ) space that are of points collinear in the Cartesian coordinate system may fall within a small rectangular frame that is formed by $d_r$ and $d_\theta$ and whose edges are respectively parallel to an r coordinate system and a θ coordinate system. In this case, linear fitting needs to be performed on the detected collinear points in the Cartesian coordinate system, to obtain the linear equation.

In addition, usually, the plurality of first edge line segments may be detected by using only one image. The image may be any one of the at least two images.

In this embodiment of the present invention, unless particularly stated, the first edge line segment is an edge line segment in a two-dimensional plane, for example, an edge line segment in an image plane. A second edge line segment is an edge line segment, for example, a photographed edge line segment (where the photographed edge line segment is usually an edge of a photographed object) corresponding to the first edge line segment, in three-dimensional space.

S230: Determine four first edge line segments in the plurality of first edge line segments.

After the plurality of edge line segments are detected, the plurality of first edge line segments may be preliminarily determined, to select the four first edge line segments that may be edge line segments of a rectangular region.

Specifically, the plurality of first edge line segment may be screened, to select first edge line segments whose lengths satisfy a requirement. Further, first edge line segments whose lengths are relatively long and that account for a proportion may be selected from the plurality of first edge line segments.

With reference to the example described in FIG. 3A to FIG. 3C in step S220, in an example, if $S(i)=N_i$, i=1, . . . , and n, and $N_i$ indicates a quantity of curves in the (r, θ) space that intersect at a point i (where i is a sequence number of an intersecting point in the (r, θ) space), values in a set S including all S(i) may be sorted in descending order, and k points satisfying a preset condition are selected, from the set S, as candidate edge lines that can form a rectangular frame. Reserved candidate edge line segments form a set E.

For example $$\frac{k}{n} < T.$$

T is a threshold, and for example, may be 5% or 10%, 5% or 10% that are relatively long may be selected, from S(i) in the manner, as the candidate edge lines. For another example, a maximum value $S_{max}$ in the set S may be calculated, and edge line segments of $S(i) \geq S_{max}*T$ are reserved. T is a threshold, for example, 5% or 10%. It may be understood that the candidate edge line segments in the set E are relatively long edge line segments in all the edge line segments.

A plurality of first edge line segments that are relatively long may be selected in the foregoing manner. The plurality of first edge line segments whose lengths satisfy the requirement may be further determined, to select a combination of four first edge line segments that satisfies a condition, to be specific, the four edge line segments that may be edges of the rectangular region. In an embodiment, if a set of the plurality of detected first edge line segments is E, any four sides $l_1$, $l_2$, $l_3$, and $l_4$ are selected from E, and a region of a quadrangle formed by the four first edge line segments is determined. The four sides may intersect with each other in pairs. Therefore, there are a maximum of six intersecting points among the four first edge line segments, and four correct intersecting points need to be found out from the six intersecting points. An angle between each of the four first edge line segments and the x-axis may be calculated. Assuming that there are four angles, the four angles may be sorted; and after the sorting, lines corresponding to the first two angles are two opposite first edge line segments, and lines corresponding to the last two angles are two opposite first edge line segments. The region of the quadrangle formed by any four first edge line segments selected from E may be determined hereto, to facilitate screening.

S240: Determine, based on location information of a plurality of first feature points in a region formed by the four first edge line segments in the at least two images, locations of photographed points corresponding to the plurality of first feature points in the region, where the plurality of first feature points in the region include four vertexes of a quadrangle formed by the four first edge line segments.

In step S230, the combination of the four first edge line segments that satisfies the condition is determined, to be specific, the four side line segments that may be the edges of the rectangular region are selected. There may be a plurality of combinations of four first edge line segments that satisfy the condition.

In step S240, the combinations of four first edge line segments that satisfy the condition may be further determined, to select, from the combinations of four first edge line segments, a combination of four first edge line segments forming a region whose corresponding photographed object is a plane, in other words, a combination of four first edge line segments forming a region whose corresponding photographed object is not a plane is excluded from the combinations of four first edge line segments.

Specifically, the region of the quadrangle formed by the four first edge line segments may be determined in step S230, and it is determined whether the photographed points corresponding to the first feature points in the region formed by the four first edge line segments are coplanar, to determine whether a photographed object corresponding to the region formed by the four first edge line segments is a plane. Locations of the feature points in different images are traced, and three-dimensional reconstruction is performed based on the locations of the feature points in different images, to determine the locations of the photographed points corresponding to the feature points.

It should be noted that the first feature points in different images are detected, and similarity (for example, a Euclidean distance) between descriptors of two first feature points in different images is calculated, to determine whether the two first feature points are matched. If the two first feature points are matched, it is considered that two first feature points in different images are a same feature point, thereby implementing tracing of the first feature points in different images and determining the location information of the first feature points in different images.

In an example, coordinates (locations) of the plurality of first feature points in different images may be traced by using a feature point tracing technology, and coordinates of second feature points in a first three-dimensional coordinate system are calculated by using a bundle adjustment (English: Bundle Adjustment) technology based on the coordinates of the plurality of first feature points in different images. Further, a camera pose may be calculated, to be specific, a second three-dimensional coordinate system is constructed based on coordinates of coplanar second feature points in the first three-dimensional coordinate system, and coordinates of the second feature points in the second three-dimensional coordinate system are calculated. A rotation matrix and a displacement vector from the second three-dimensional coordinate system to the first three-dimensional coordinate system and an internal parameter (a calibration matrix) of a camera are calculated based on the coordinates of the second feature points in both the first three-dimensional coordinate system and the second three-dimensional coordinate system.

In an example, a reprojection error (Reprojection Error) function of each point may be calculated by tracing a same feature point in different images.

A target function (which is usually a sum of reprojection errors) may be minimized by using some optimization algorithms (for example. Gauss-Newton), to obtain coordinates of each first feature point in the image in the first three-dimensional coordinate system.

S250: Determine, when the photographed points corresponding to the plurality of first feature points in the region formed by the four first edge line segments are coplanar, that the region is a rectangular region.

The locations of the photographed points corresponding to the first feature points in the region formed by the four first edge line segments may be determined in step S240, and it may be determined whether the photographed points corresponding to these first feature points are coplanar. If the photographed points are coplanar, it indicates that the region formed by the four first edge line segments may be a rectangular region needing to be detected. If the photographed points are not coplanar, it may be determined that the region formed by the four first edge line segments is not a rectangular region needing to be detected. In this case, step S230 needs to be performed again, to re-determine four first edge line segments for determining.

Specifically, the coordinates of the second feature points corresponding to the first feature points in the region formed by the four first edge line segments in the first three-dimensional coordinate system may be determined in step S240, and it may be determined whether the second feature points are coplanar in three-dimensional space.

Further, based on a plane in which any three of the second feature points lie, distances between other points than the three selected points in all the second feature points and the plane may be obtained. When an average distance of the points is less than a threshold, the second feature points are coplanar.

It should be noted that, a noise factor and an error factor in an actual engineering application need to be considered. Therefore, the threshold is set. For example, the threshold may be 0.1 centimeter or 0.5 centimeter.

It should be understood that, the four first edge line segments in step S250 are four first edge line segments selected through step S230 from the plurality of first edge line segments in step S220. When it is determined in step S250 that the region formed by the four first edge line segments is not coplanar, step S230 is performed again to reselect four first edge line segments. This process is an iterative process, and the procedure does not end until a region formed by selected four first edge line segments is coplanar or all combinations of the plurality of first edge line segments in step S220 have been selected. In this embodiment of the present invention, descriptions are provided by using only one process of determining whether the four first edge line segments are coplanar as an example, and no limitation is imposed.

In this embodiment of the present invention, a plurality of combinations of four first edge line segments that satisfy the condition may be determined in step S230. It may be sequentially determined whether photographed points corresponding to first feature points in a region formed by each combination are coplanar. When photographed points corresponding to first feature points in a region formed by a combination are not coplanar, it is considered that four first edge line segments corresponding to the combination are not four sides of the rectangular region, and another combination may continue to be determined. When photographed points corresponding to feature points in a region formed by a combination are coplanar, it is considered that four first edge line segments corresponding to the combination may be four sides of the rectangular region.

To make determining of the rectangular region more accurate, when it is determined that photographed points corresponding to feature points in a region formed by a combination are coplanar, the four first edge line segments may be further determined, to determine whether the four first edge line segments are four sides of the rectangular region. After a combination is further determined, and when it is determined that the combination is not four sides of the rectangular region, another combination may continue to be determined. After a combination is further determined, and when it is determined that the combination is four sides of the rectangular region, it is considered that four first edge line segments corresponding to the combination are four sides of the rectangular region. The process is specifically described as follows.

Further, when it is determined that the photographed points corresponding to the feature points in the region formed by the four first edge line segments are coplanar, the four first edge line segments may be further determined, and the determining may include determining whether the region formed by the four first edge line segments is sufficiently large, for example, whether an area or a perimeter of the region is greater than a threshold T, for example, ¼ of a total area of the image or ¼ of a sum of a width and a height of the image.

A process in which edge line segments detected in a two-dimensional plane are transformed into three-dimensional space and rectangular region detection is performed based on rectangle geometric characteristics such as parallelism, an angle, and a distance between edge line segments in the three-dimensional space is further described. The process may be performed in combination with steps in a process of determining whether photographed points corresponding to feature points in a region formed by the edge line segments are coplanar, or may be separately performed.

Figure 4:
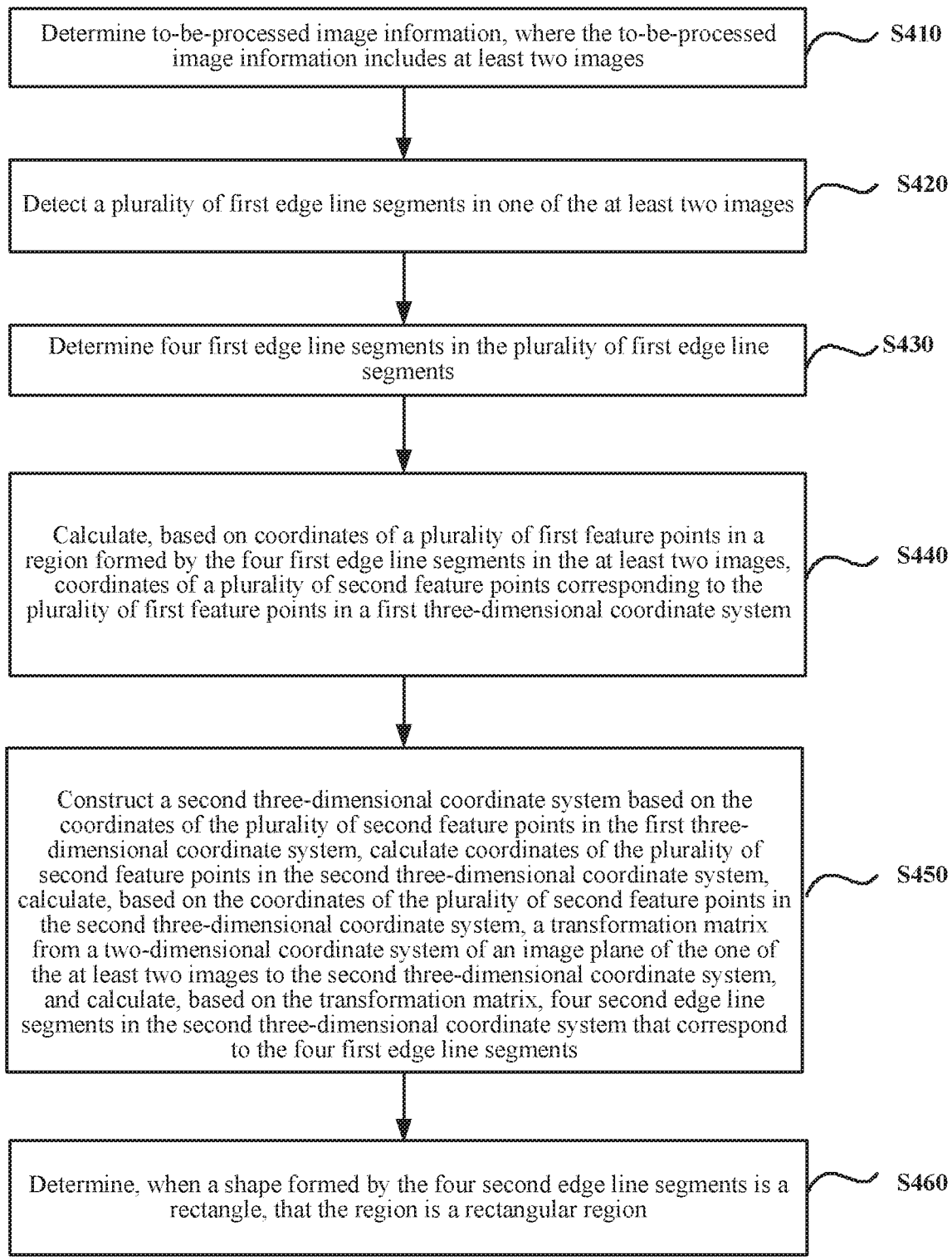
FIG. 4 is a flowchart of another rectangular region detection method according to an embodiment of the present invention.

FIG. 4 is a flowchart of another rectangular region detection method according to an embodiment of the present invention. As shown in FIG. 4, in the method, actual locations of edge line segments are determined, and a rectangular region in an image is recognized based on the actual locations.

S410: Determine to-be-processed image information, where the to-be-processed image information includes at least two images, and the at least two images include a same plurality of first feature points.

S420: Detect a plurality of first edge line segments in one of the at least two images.

For steps S410 and S420, refer to the descriptions of steps S210 and S220 in the embodiment shown in FIG. 2.

S430: Determine four first edge line segments in the plurality of first edge line segments.

For step S430, refer to the descriptions of steps S230 to S250 in the embodiment shown in FIG. 2. To be specific, in this embodiment of the present invention, further determining may be performed based on a determining result in the embodiment shown in FIG. 2.

In an example, when it is determined that photographed points corresponding to feature points in a region formed by the four first edge line segments are coplanar, the further determining may be performed, and specifically includes: determining, based on the four first edge line segments, four second edge line segments corresponding to the four first edge line segments, and determining, depending on whether a shape formed by the four second edge line segments is a rectangle, whether the region formed by the four first edge line segments is a rectangular region. In other words, combinations of four first edge line segments that are determined in step S250 may be further screened by determining whether a shape formed by photographed edge line segments corresponding to the four first edge line segments is a rectangle.

In another example, in the embodiment shown in FIG. 2, it is determined that in the plurality of first edge line segments, photographed points corresponding to feature points in regions formed by a plurality of combinations of four first edge line segments are coplanar, and the regions formed by the plurality of combinations of four first edge line segments are sufficiently large. Therefore, the following determining may be performed on the plurality of combinations of four first edge line segments in sequence: determining, based on four first edge line segments, four second edge line segments corresponding to the four first edge line segments, and determining, depending on whether a shape formed by the four second edge line segments is a rectangle, whether a region formed by the four first edge line segments is the rectangular region.

Optionally, for step S430, refer to only step S230 in the embodiment shown in FIG. 2, and the following determining is directly performed on results in step S230 in sequence.

S440: Calculate, based on coordinates of a plurality of first feature points in a region formed by the four first edge line segments in the at least two images, coordinates of a plurality of second feature points corresponding to the plurality of first feature points in a first three-dimensional coordinate system.

For this step, refer to the descriptions of step S240 in the embodiment shown in FIG. 2.

It should be noted that in step S430, if it is determined whether photographed points corresponding to the plurality of first feature points in the region formed by the four first edge line segments are coplanar, to be specific, in step S430, if the coordinates of the second feature points corresponding to the first feature points in the region formed by the four first edge line segments in the first three-dimensional coordinate system are calculated, step S450 is directly performed based on the coordinates of the second feature points in the first three-dimensional coordinate system that are obtained in step S430.

In step S430, if it is not determined whether the photographed points corresponding to the plurality of first feature points in the region formed by the four first edge line segments are coplanar, step S440 is performed.

S450: Construct a second three-dimensional coordinate system based on the coordinates of the plurality of second feature points in the first three-dimensional coordinate system, calculate coordinates of the plurality of second feature points in the second three-dimensional coordinate system, calculate, based on the coordinates of the plurality of second feature points in the second three-dimensional coordinate system, a transformation matrix from a two-dimensional coordinate system of an image plane of the one of the at least two images to the second three-dimensional coordinate system, and calculate, based on the transformation matrix, four second edge line segments in the second three-dimensional coordinate system that correspond to the four first edge line segments, where two of three coordinate axes of the second three-dimensional coordinate system are coplanar with the plurality of second feature points, or a plane defined by two of three coordinate axes of the second three-dimensional coordinate system is parallel to a plane defined by the plurality of second feature points.

It should further be noted that, if coordinates of several points on an object in the first three-dimensional coordinate system and the second three-dimensional coordinate system are already known, when a calibration matrix of a photographing device is determined, the transformation matrix from the first three-dimensional coordinate system to the second three-dimensional coordinate system may be calculated based on two-dimensional coordinates of these points in the image.

A transformation matrix T is usually a 4×4 homogeneous matrix, or may be indicated by using a combination of a 3×3 rotation matrix R and a 3×1 translation vector t:

$$T = \begin{bmatrix} R & t \\ 0 & 1 \end{bmatrix}. \tag{2}$$

An orthogonal rotation matrix R in the formula (2) may be indicated by using three 3×1 column vectors, as shown in a formula (3):

$$R = [r_1 r_2 r_3] \tag{3}.$$

Therefore, homogeneous coordinates of the first feature point that is in the image and that is obtained through projection of the photographed point corresponding to the first feature point may be indicated by using a formula (4). In the formula (4), K is a calibration matrix of a camera. The calibration matrix is usually an internal parameter of the photographing device, or may be calculated by using the foregoing bundle adjustment method.

$$\bar{p} = K * \left( [r_1 \quad r_2 \quad r_3] * \begin{bmatrix} X \\ Y \\ 0 \end{bmatrix} + t \right); \tag{4}$$

$$= K * \left( [r_1 \quad r_2] * \begin{bmatrix} X \\ Y \end{bmatrix} + t \right); \text{ and}$$

$$= K * \left( [r_1 \quad r_2 \quad t] * \begin{bmatrix} X \\ Y \\ 1 \end{bmatrix} + t \right).$$

A transformation H between any point in a plane that is in the second three-dimensional coordinate system and that corresponds to the region formed by the four first edge line segments and a point corresponding to the point in a two-dimensional image may be indicated by using a formula (5) hereto. H is the transformation matrix from a three-dimensional plane to the image plane that needs to be calculated.

$$H = K * [r_1 r_2 t] \tag{5}.$$

In an example, a second three-dimensional coordinate system P may be defined (newly constructed) in a first three-dimensional coordinate system O corresponding to the region formed by the first edge line segments. In the second three-dimensional coordinate system, a z-axis component corresponding to any point in the region formed by the first edge line segments is 0. Because the z-axis component corresponding to any point in the region formed by the first edge line segments is 0, coordinates corresponding to the feature point in the region formed by the first edge line segments in the coordinate system P may be obtained based on coordinates in the two-dimensional coordinate system of the image plane. Therefore, a transformation matrix T from the coordinate system P to the camera coordinate system O may be calculated based on coordinates of at least four pairs of feature points in the camera coordinate system O and the defined three-dimensional coordinate system P (where a specific calculation method includes DLT and the like), and the transformation matrix T is a camera pose.

Figure 5:
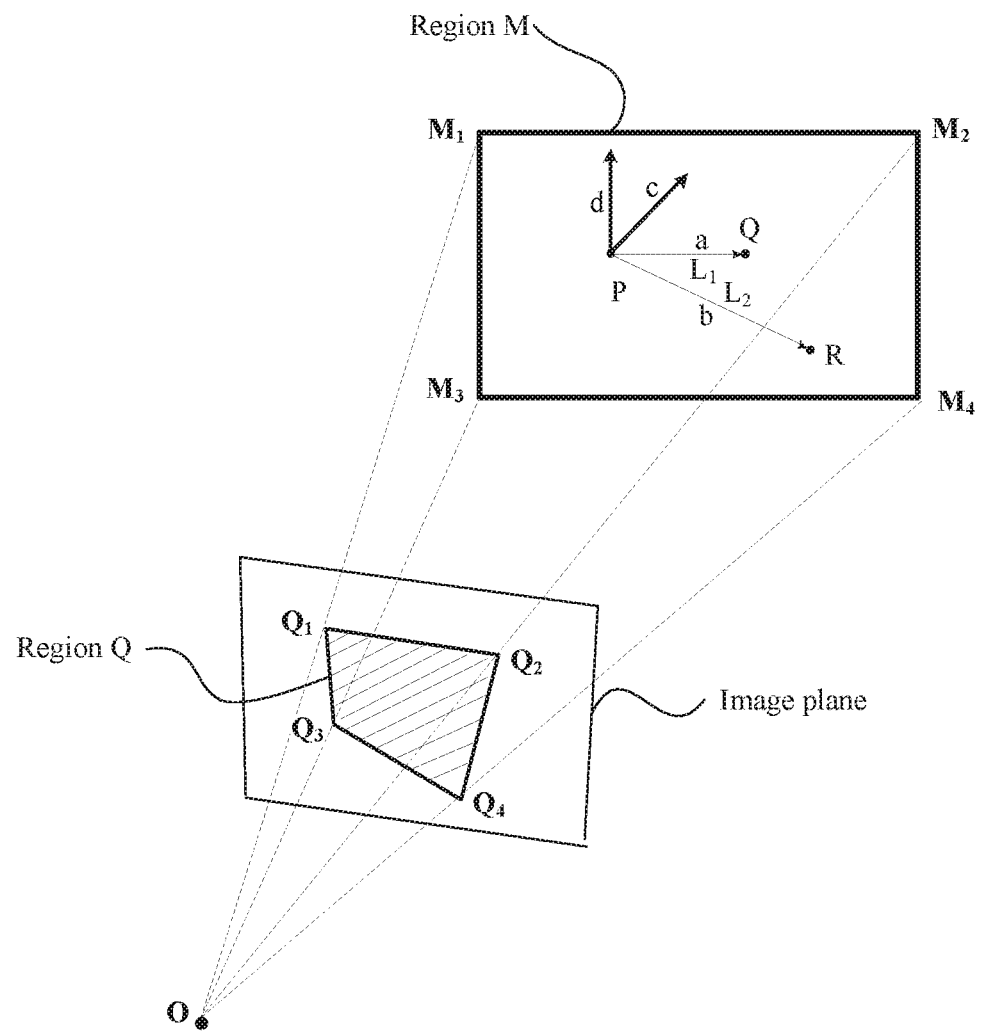
FIG. 5 shows an example according to an embodiment of the present invention.

As shown in FIG. 5, assuming that a plane that is in a camera three-dimensional coordinate system (a coordinate system using O as an origin in the figure) and that corresponds to a region Q is a plane M, any three points P (Xp, Yp, Zp), Q (Xq, Yq, Zq), and R (Xr, Yr, Zr) that are not collinear are selected from the plane M. The points P, Q, and R may be second feature points. Direction vectors a and b of a straight line PQ and a straight line PR are respectively shown in a formula (6) and a formula (7):

$$a=(Xq-Xp,Yq-Yp,Zq-Zp)/\|PQ\| \quad (6): \text{and}$$

$$b=(Xr-Xp,Yr-Yp,Zr-Zp)/\|PR\|. \quad (7).$$

In the formula (6), $\|PQ\|=\sqrt{(Xq-Xp)^2+(Yq-Yp)^2+(Zq-Zp)^2}$. In the formula (7), $\|PR\|=\sqrt{(Xr-Xp)^2+(Yr-Yp)^2+(Zr-Zp)^2}$. Therefore, a normal vector of the plane M is $c=(a\times b)/\|a\times b\|$, to be specific, a unit vector obtained after cross product vectors of the vector a and the vector b are normalized. A direction vector of a straight line perpendicular to the straight line PQ in the plane M is $d=(a\times c)/\|a\times c\|$.

The vectors a and d are indicated as $a=(a_x, a_y, a_z)$ and $d=(d_x, d_y, d_z)$.

Therefore, equations of straight lines $L_1$ and $L_2$ that pass through the point P and that are perpendicular to each other in the plane M are respectively a formula (8) and a formula (9):

$$\frac{x-X_p}{a_x} = \frac{y-Y_p}{a_y} = \frac{z-Z_p}{a_z}; \text{ and} \quad (8)$$

$$\frac{x-X_p}{d_x} = \frac{y-Y_p}{d_y} = \frac{z-Z_p}{d_z}. \quad (9)$$

In this case, a Cartesian coordinate system may be defined in the plane M by using the point P and the straight lines $L_1$ and $L_2$. The point P is an origin, and the straight lines $L_1$ and $L_2$ are respectively an x-axis and a y-axis. Therefore, a distance between any point A in the plane M and the straight line $L_2$ is an absolute value of an x-coordinate $X_a$ of the point A, a distance between the point A ($X_a$, $Y_a$, $Z_a$) and the straight line $L_1$ is an absolute value of a y-coordinate Y. of the point A. and a z-coordinate of the point A is 0. Assuming that a direction vector of a vector PA is $e=(Xa-Xp, Ya-Yp, Za-Zp)/\|PA\|=(e_x, e_y, e_z)$, the absolute values |Xa| and |Ya| of the coordinates $X_a$ and $Y_a$ may be respectively calculated by using a formula (10) and a formula (11):

$$|Xa| = \frac{\sqrt{\left(\left|\begin{matrix} Ya-Yp & Za-Zp \\ a_y & a_z \end{matrix}\right|+\left|\begin{matrix} Za-Zp & Xa-Xp \\ a_z & a_x \end{matrix}\right|+\left|\begin{matrix} Xa-Xp & Ya-Yp \\ a_x & a_y \end{matrix}\right|\right)}}{\sqrt{a_x^2+a_y^2+a_z^2}}; \text{ and} \quad (10)$$

$$|Ya| = \frac{\sqrt{\left(\left|\begin{matrix} Ya-Yp & Za-Zp \\ d_y & d_z \end{matrix}\right|+\left|\begin{matrix} Za-Zp & Xa-Xp \\ d_z & d_x \end{matrix}\right|+\left|\begin{matrix} Xa-Xp & Ya-Yp \\ d_x & d_y \end{matrix}\right|\right)}}{\sqrt{d_x^2+d_y^2+d_z^2}}. \quad (11)$$

In the formula (10), $$\left|\begin{matrix} Ya-Yp & Za-Zp \\ a_y & a_z \end{matrix}\right|, \left|\begin{matrix} Za-Zp & Xa-Xp \\ a_z & a_x \end{matrix}\right|, \left|\begin{matrix} Xa-Xp & Ya-Yp \\ a_x & a_y \end{matrix}\right|,$$

$$\left|\begin{matrix} Ya-Yp & Za-Zp \\ d_y & d_z \end{matrix}\right|, \left|\begin{matrix} Za-Zp & Xa-Xp \\ d_z & d_x \end{matrix}\right|, \text{ and}$$

$$\left|\begin{matrix} Xa-Xp & Ya-Yp \\ d_x & d_y \end{matrix}\right|$$

are determinants.

Therefore, the coordinates $X_a$ and $Y_a$ may be respectively calculated by using a formula (12) and a formula (13):

$$X_a = \begin{cases} |Xa| & \text{when } a\cdot e \geq 0 \\ -|Xa| & \text{when } a\cdot e < 0 \end{cases}; \text{ and} \quad (12)$$

$$Y_a = \begin{cases} |Ya| & \text{when } d\cdot e \geq 0 \\ -|Ya| & \text{when } d\cdot e < 0 \end{cases}. \quad (13)$$

In the formula (12) and the formula (13), $a\cdot e=a_x\cdot e_x+a_y\cdot e_y+a_z\cdot e_z$, and $d\cdot e=d_x\cdot e_x+d_y\cdot e_y+d_z\cdot e_z$.

Coordinate values of any point A in a camera coordinate system in the Cartesian coordinate system P newly created in the plane M that is in the camera three-dimensional coordinate system and that corresponds to the region Q may be obtained hereto. The camera pose may be calculated by using the foregoing algorithm such as the DLT based on coordinates of at least four points in the plane M in the camera coordinate system that are in the camera three-dimensional coordinate system O and coordinate values of these points in the coordinate system P. and then the transformation matrix H is calculated.

It should be noted that, a photographing device coordinate system may mean that an optical center of a photographing device is used as an origin, an x-axis and a y-axis are respectively parallel to an x-axis and a y-axis of the image, and a z-axis is an optical axis of the photographing device and is perpendicular to the image plane. Coordinates of an intersecting point between the z-axis and the image plane in the image plane are ($u_0$, $v_0$). At last, a transformation matrix from the first edge line segments in a two-dimensional plane to the second edge line segments in the three-dimensional plane is $H^T$, and $H^T$ is a transposed matrix of the matrix H. Certainly, two endpoints of a line segment in the two-dimensional image plane may alternatively be separately transformed into the three-dimensional space by using an inverse matrix $H^{-1}$ of the matrix H. In this case, the second edge line segments in the three-dimensional space of the camera coordinate system that correspond to the first edge line segments in the two-dimensional image plane may be calculated.

S460: Determine, when a shape formed by the four second edge line segments is a rectangle, that the region is a rectangular region.

It should be noted that when it is determined whether the shape formed by the second edge line segments is a rectangle, it may be determined, according to rectangle features (for example, an angle and a length relationship), whether four sides of a detected quadrangle can form a rectangle in the three-dimensional space. In an ideal case, two opposite sides should be parallel to each other, an angle between two neighboring sides should be a right angle, lengths of two opposite sides should be equal to each other, and a distance between two opposite sides should be equal to lengths of the other two sides. However, considering impact of factors such as noise and an error in an actual engineering application, a determining condition may be properly relaxed (where a difference from a determining condition in the two-dimensional plane is that, a range of the determining condition is relatively large due to distortion in the two-dimensional plane; and there is no distortion in the three-dimensional space in an ideal case, and the determining condition should be the rectangle features).

For example, first, an angle between two opposite sides should fall within a range of (−T1 to +T1). T1 is an angle, for example, 5° or 10°, that is greater than 0.

Second, a difference between lengths of two opposite sides should fall within a range of (−T2 to +T2). T2 is a rational number greater than 0.

Third, a difference between a distance between two opposite sides and lengths of the other two sides should fall within a range of (−T3 to +T3). T3 is a rational number greater than 0.

Four, an angle between two neighboring sides should fall within a range of (90°−T4 to 90°+T4). T4 is an angle, for example, 5° or 10°, that is greater than 0.

According to this embodiment of the present invention, rectangular region detection may be implemented by using the second edge line segments. The second edge line segments are line segments in the three-dimensional space, and there is no distortion in the three-dimensional space. Therefore, a possibility of erroneous determining of the rectangular region is reduced, and user experience is improved.

It should be understood that, the four second edge line segments in step S460 are four second edge line segments corresponding to the four first edge line segments selected through step S430 from the plurality of first edge line segments in step S420. When it is determined in step S460 that the shape formed by the four second edge line segments is not a rectangle, step S430 is performed again to reselect four first edge line segments. The process is an iterative process, and the procedure does not end until a shape formed by selected four second edge line segments is a rectangle or all combinations of the plurality of first edge line segments in step S420 are selected. In this embodiment of the present invention, descriptions are provided by using only one process of determining whether the shape formed by the four second edge line segments is a rectangle as an example, and no limitation is imposed.

Rectangular region detection manners are mainly described in the foregoing embodiments. The detected rectangular region may be processed based on information in the three-dimensional space, and further descriptions are provided below with reference to a specific embodiment.

Figure 6:
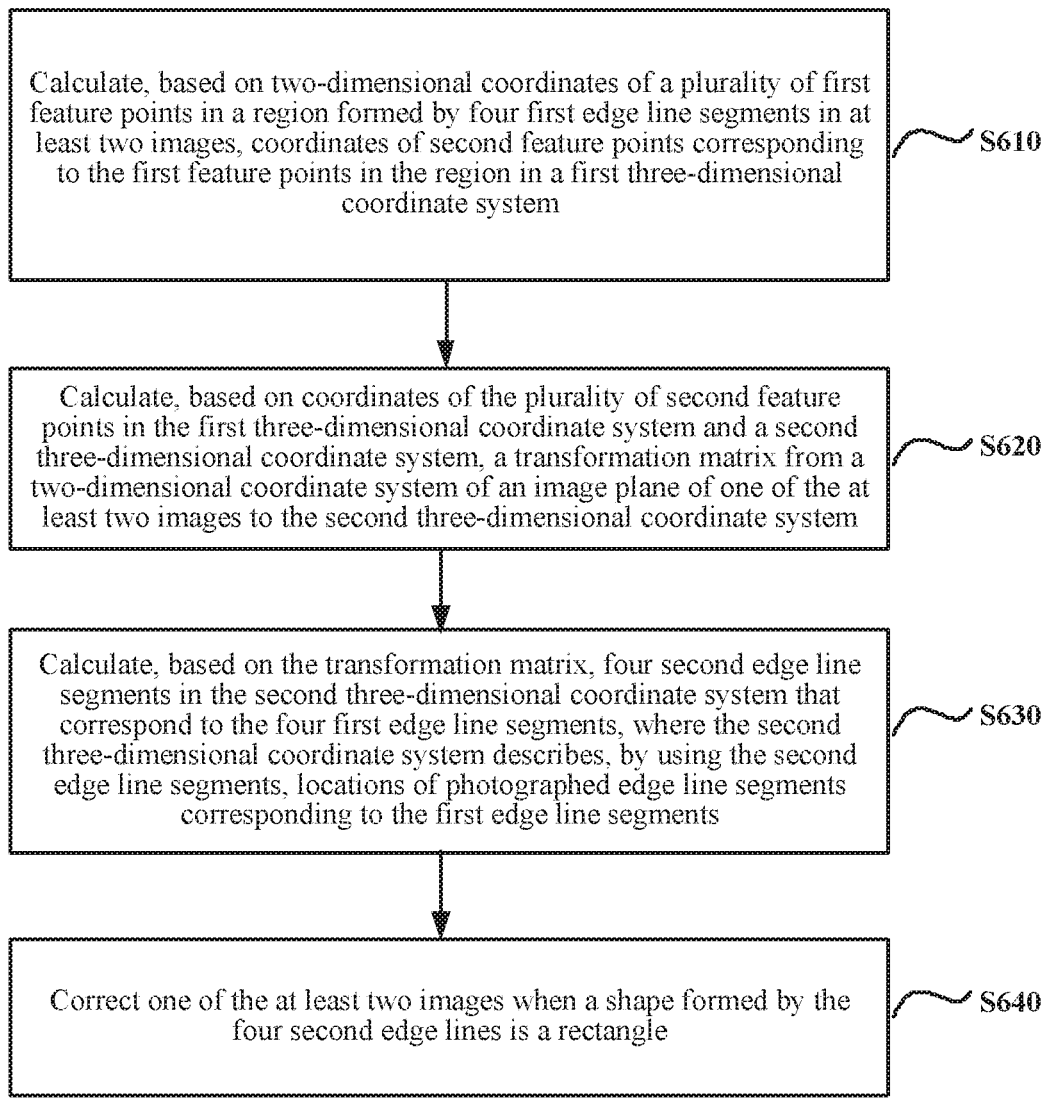
FIG. 6 is a flowchart of an image processing method according to an embodiment of the present invention.

FIG. 6 is a flowchart of an image processing method according to an embodiment of the present invention. As shown in FIG. 6, in the method, actual locations of edge line segments are determined, a correction parameter is determined based on the actual locations, and a rectangular region in an image is corrected.

In the method, the rectangular region in the image may be detected with reference to the embodiment shown in FIG. 2 or FIG. 4 or a combination of the embodiments shown in FIG. 2 and FIG. 4. Certainly, the rectangular region may alternatively be detected in the prior art or with reference to a combination of the prior art and the embodiment shown in FIG. 2, a combination of the prior art and the embodiment shown in FIG. 4, or a combination of the prior art and the embodiments shown in FIG. 2 and FIG. 4. When the rectangular region is corrected, the present invention may further include the following steps.

S610: Calculate, based on two-dimensional coordinates of the plurality of first feature points in the region formed by the four first edge line segments in the at least two images, coordinates of second feature points corresponding to the first feature points in the region in a first three-dimensional coordinate system.

S620: Calculate, based on coordinates of the plurality of second feature points in the first three-dimensional coordinate system and a second three-dimensional coordinate system, a transformation matrix from a two-dimensional coordinate system of an image plane of one of the at least two images to the second three-dimensional coordinate system.

S630: Calculate, based on the transformation matrix, four second edge line segments in the second three-dimensional coordinate system that correspond to the four first edge line segments, where the second three-dimensional coordinate system describes, by using the second edge line segments, locations of photographed edge line segments corresponding to the first edge line segments.

Steps S610 to S630 are similar to the descriptions in steps S440 and S450 in the embodiment shown in FIG. 4, and may be understood with reference to the descriptions in steps S440 and S450. Details are not described again.

It should be noted that, if in a rectangle detection process (for example, the rectangular region detection process described in the embodiment shown in FIG. 4), the transformation matrix from the two-dimensional coordinate system of the image plane to the second three-dimensional coordinate system has been calculated, steps S610 to S630 may not be performed in this embodiment of the present invention, and the following step is directly performed by using the transformation matrix obtained in the rectangular region detection process.

S640: Correct one of the at least two images when a shape formed by the four second edge lines is a rectangle.

For a condition that the shape formed by the four second edge lines is a rectangle, refer to the descriptions in the embodiment shown in FIG. 2.

An aspect ratio of the rectangle formed by the four second edge line segments may be determined based on the four second edge line segments, and the image is corrected based on the aspect ratio.

The aspect ratio is calculated based on a width and a height of the rectangle in three-dimensional space, to correct the image, so that it can be ensured that an aspect ratio of an image of the corrected rectangular region remains consistent with an actual aspect ratio, to avoid image distortion caused by stretching and compression due to an erroneous aspect ratio.

Figure 7A:
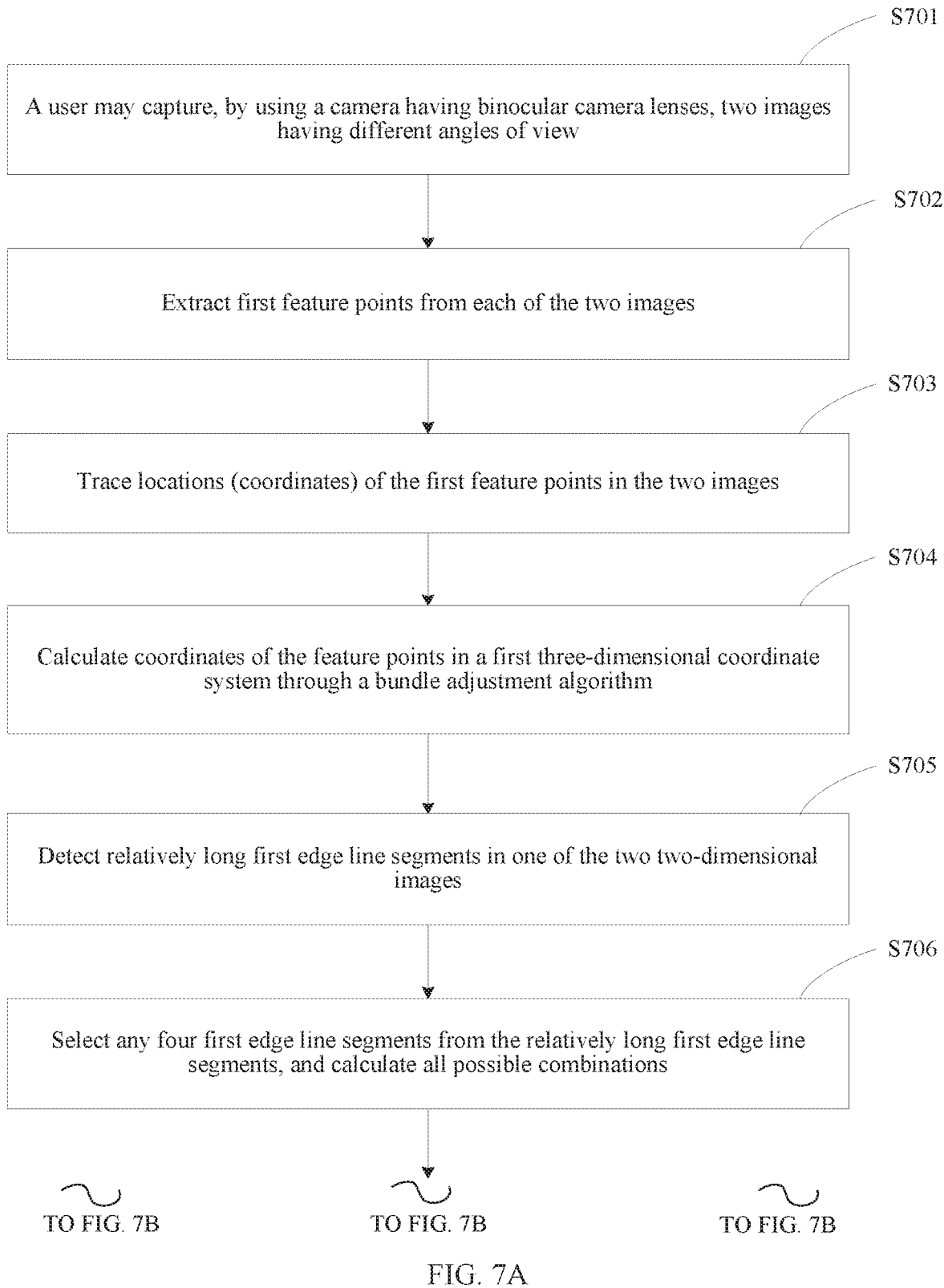
FIG. 7A and FIG. 7B are a flowchart of an example of an image processing method according to an embodiment of the present invention.
Figure 7B:
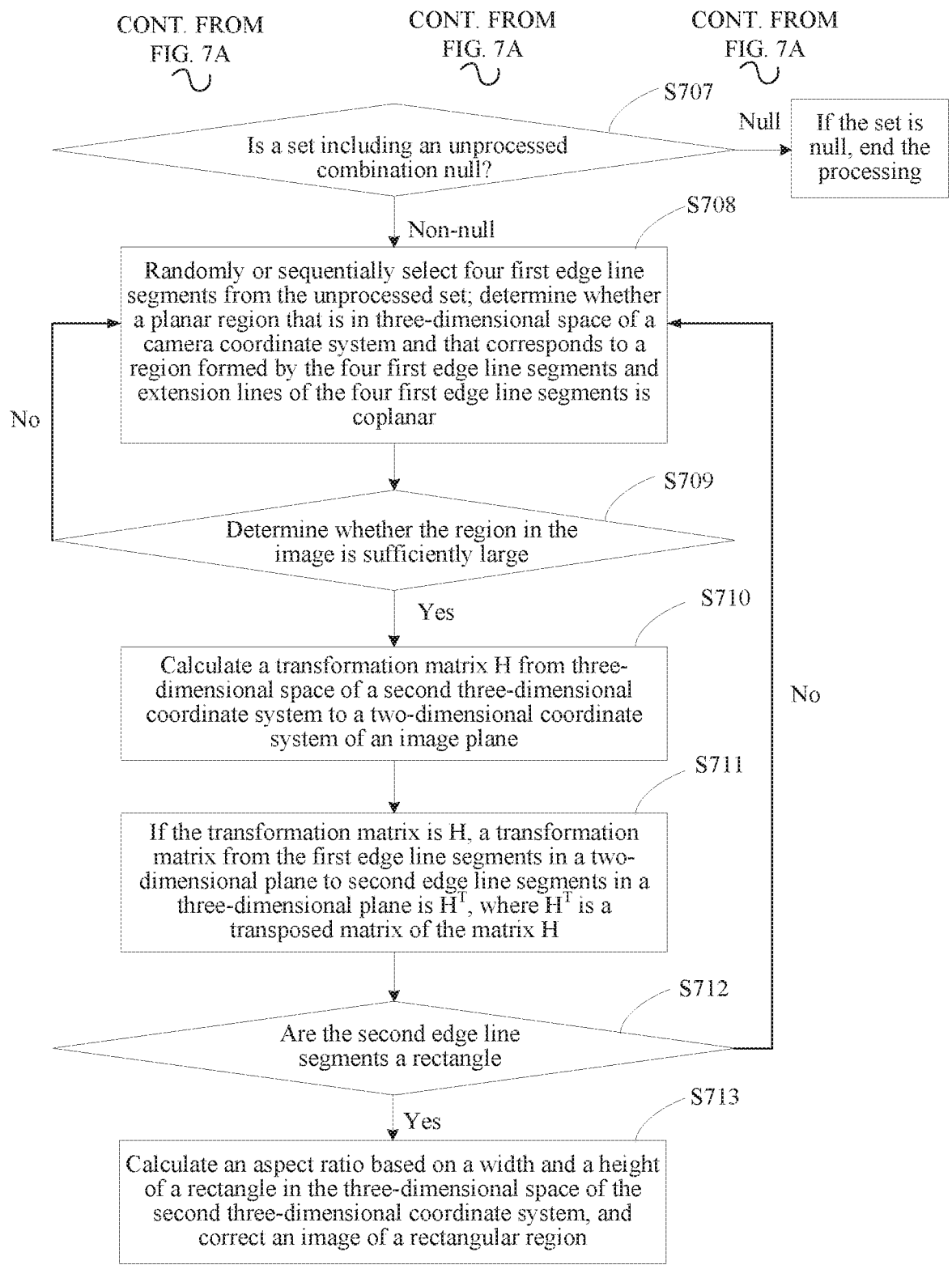

FIG. 7A and FIG. 7B are a flowchart of an example of an image processing method according to an embodiment of the present invention. As shown in FIG. 7A and FIG. 7B, the method specifically includes the following steps.

S701: A user may capture, by using a camera having binocular camera lenses, two images having different angles of view.

S702: Extract first feature points from each of the two images.

S703: Trace locations (coordinates) of the first feature points in the two images.

S704: Calculate coordinates of the feature points in a first three-dimensional coordinate system through a bundle adjustment algorithm.

S705: Detect relatively long first edge line segments in one of the two two-dimensional images, where a specific manner described in step S230 in the embodiment shown in FIG. 2 may be referenced.

S706: Select any four first edge line segments from the relatively long first edge line segments, and calculate all possible combinations.

S707: Determine whether a set including an unprocessed combination in the combinations obtained in step S706 is null, and if the set is null, end the processing.

S708: Randomly or sequentially select four first edge line segments from the unprocessed set; determine whether a planar region that is in three-dimensional space of a camera coordinate system and that corresponds to a region formed by the four first edge line segments and extension lines of the four first edge line segments is coplanar, where specific manners described in steps S440 and S450 in the embodiment shown in FIG. 4 may be referenced; and if the planar region that is in the three-dimensional space of the first three-dimensional coordinate system and that corresponds to the region formed by the four first edge line segments and the extension lines of the four first edge line segments is not coplanar, select another combination of four first edge line segments for continuous determining, and if no planar region that is in the three-dimensional space of the first three-dimensional coordinate system and that corresponds to a region formed by four first edge line segments and extension lines of the four first edge line segments is coplanar, end the operation; or if the planar region that is in the three-dimensional space of the first three-dimensional coordinate system and that corresponds to the region formed by the four first edge line segments and the extension lines of the four first edge line segments is coplanar, perform step S709.

S709: Determine whether the region in the image is sufficiently large, and if the region is not sufficiently large, return to step S708 to reselect four line segments, where for example, it is determined whether an area or a perimeter of the region in the image is greater than a threshold T, for example, ¼ of a total area of the image or ¼ of a sum of a width and a height of the image.

S710: Construct a second three-dimensional coordinate system based on the coordinates of the feature points in the first three-dimensional coordinate system, calculate coordinates of the feature points in the second three-dimensional coordinate system, and calculate a transformation matrix H from the second three-dimensional coordinate system to a two-dimensional coordinate system of an image plane based on the coordinates of the feature points in the second three-dimensional coordinate system and coordinates of the feature points in the two-dimensional coordinate system of the image plane, where a manner described in the embodiment shown in FIG. 4 may be referenced.

S711: If the transformation matrix is H, a transformation matrix from the first edge line segments in a two-dimensional plane to second edge line segments in a three-dimensional plane is $H^T$, where $H^T$ is a transposed matrix of the matrix H, and certainly, two endpoints of a line segment in the two-dimensional image plane may alternatively be separately transformed into the three-dimensional space by using an inverse matrix $H^{-1}$ of the matrix H, and the line segment in the two-dimensional image plane is transformed into the second three-dimensional coordinate system through calculation.

S712: It may be determined, based on an angle and a length relationship between the second edge line segments in the second three-dimensional coordinate system, whether four sides of a detected quadrangle can form a rectangle in the real world, where a manner described in the embodiment shown in FIG. 4 may be referenced.

S713: Calculate an aspect ratio based on a width and a height of a rectangle in the second three-dimensional coordinate system, and correct an image of a rectangular region.

Figure 8:
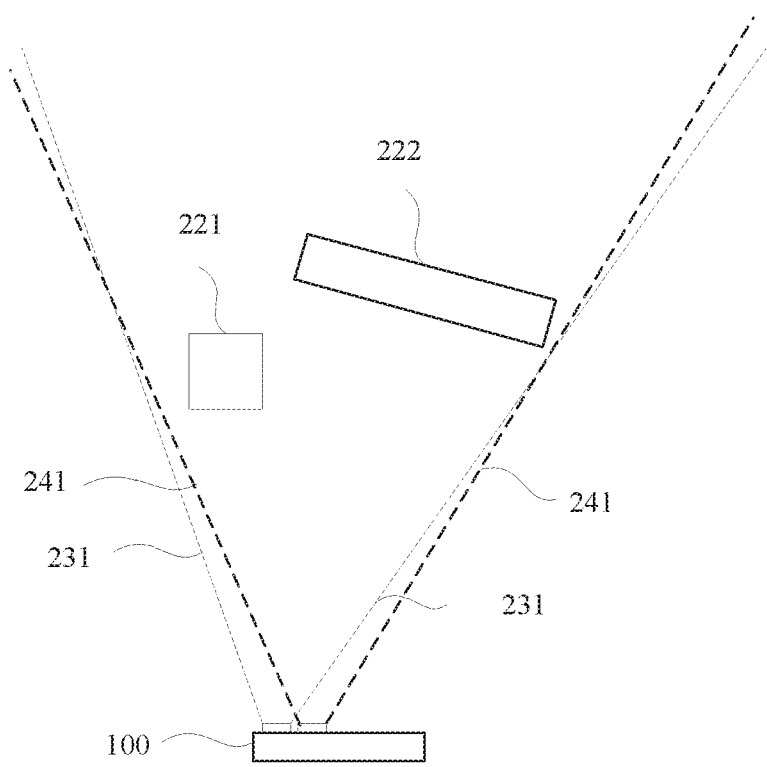
FIG. 8 shows an example of a simplified photographing scenario.
Figure 9:
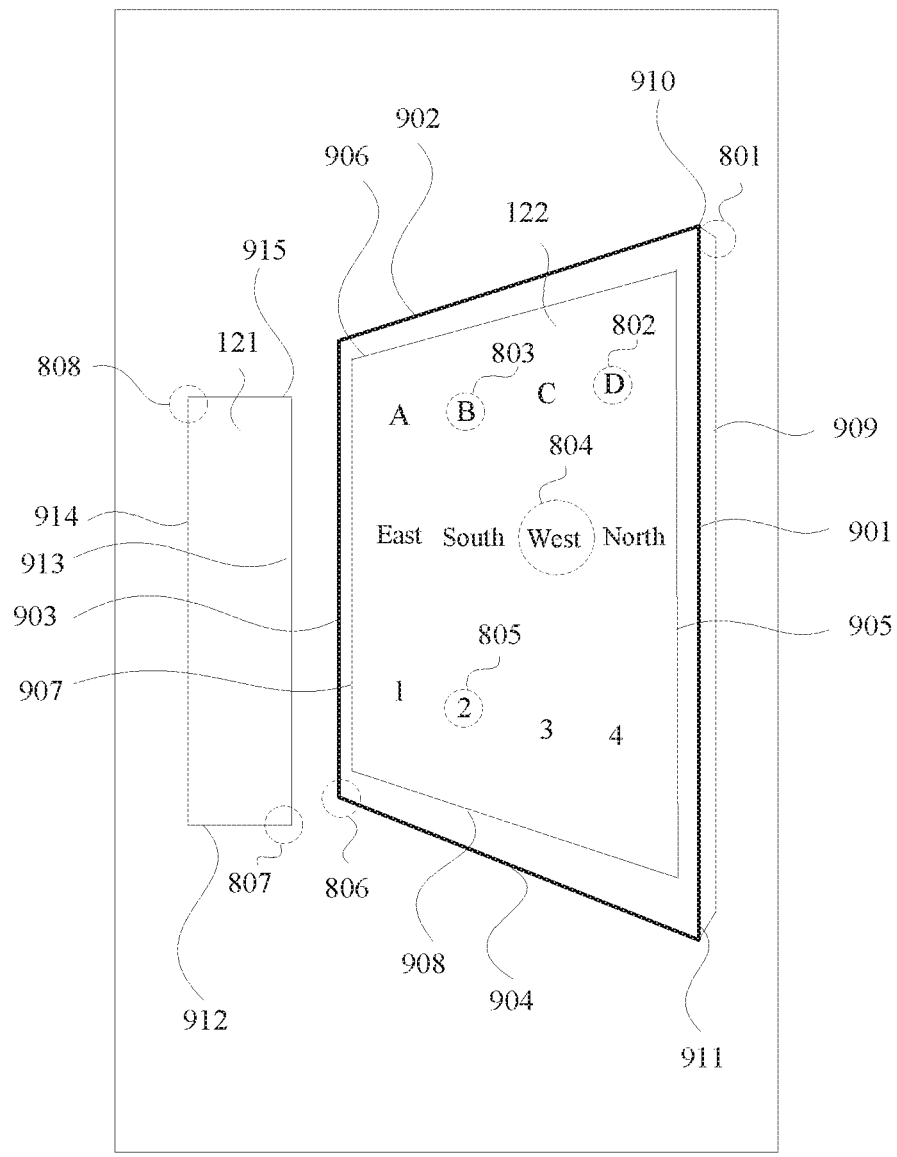
FIG. 9 shows an image example according to an embodiment of the present invention.
Figure 10:
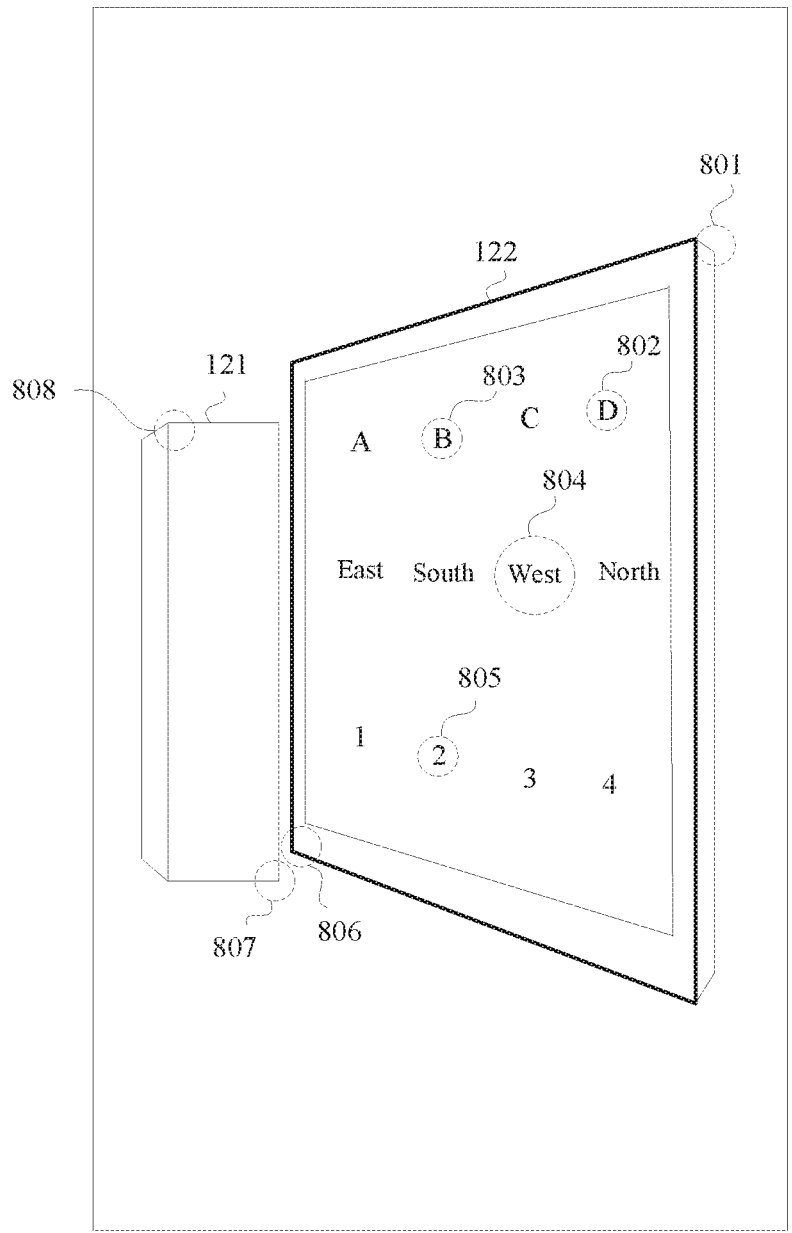
FIG. 10 shows another image example according to an embodiment of the present invention.

FIG. 8 shows an example of a simplified photographing scenario. As shown in FIG. 8, a photographing device 100 may photograph an object 221 and an object 222 at two different angles of view. The two different angles of view shown in the figure are angles of view 231 and 241. The photographing device 100 may change from one photographing angle of view to the other photographing angle of view through a rotation angle and a displacement, for example, a rotation angle and a displacement between the angle of view 231 and the angle of view 241 of the photographing device 100 that are shown in the figure. The photographing device 100 obtains two images shown in FIG. 9 and FIG. 10 at the angle of view 231 and the angle of view 241. The two images having different photographing angles of view both include first feature points 801 to 808. Coordinates of each feature point in the two images are different in image planes.

First, edge line segment detection is performed on either of the two images, to detect first edge line segments 901 to 915.

Then, the detected first edge line segments are preliminarily screened. For a screening condition, refer to the manner in the embodiment shown in FIG. 2.

After the screening, the first edge line segments 910, 911, 912, 915, and the like may be excluded based on a length requirement.

Every four of remaining edge line segments are combined. Some combinations, for example, a combination including 913 and 903 and a combination including 903 and 907, may be excluded based on a requirement on a distance between two opposite edge line segments. Certainly, the screening may alternatively be performed based on another condition shown in FIG. 2.

It is determined whether a region formed by a combination of first edge line segments that is obtained through the screening is coplanar.

Photographed points of the first feature points 802 to 806 are coplanar, and photographed points of 807 and 808 are coplanar. Therefore, when it is determined whether the region formed by the combination of the first edge line segments is coplanar, another region that is formed by a combination of first edge line segments and that includes a point in the first feature points 802 to 806 and another feature point or includes 807, 808, and another feature point is excluded.

Figure 11:
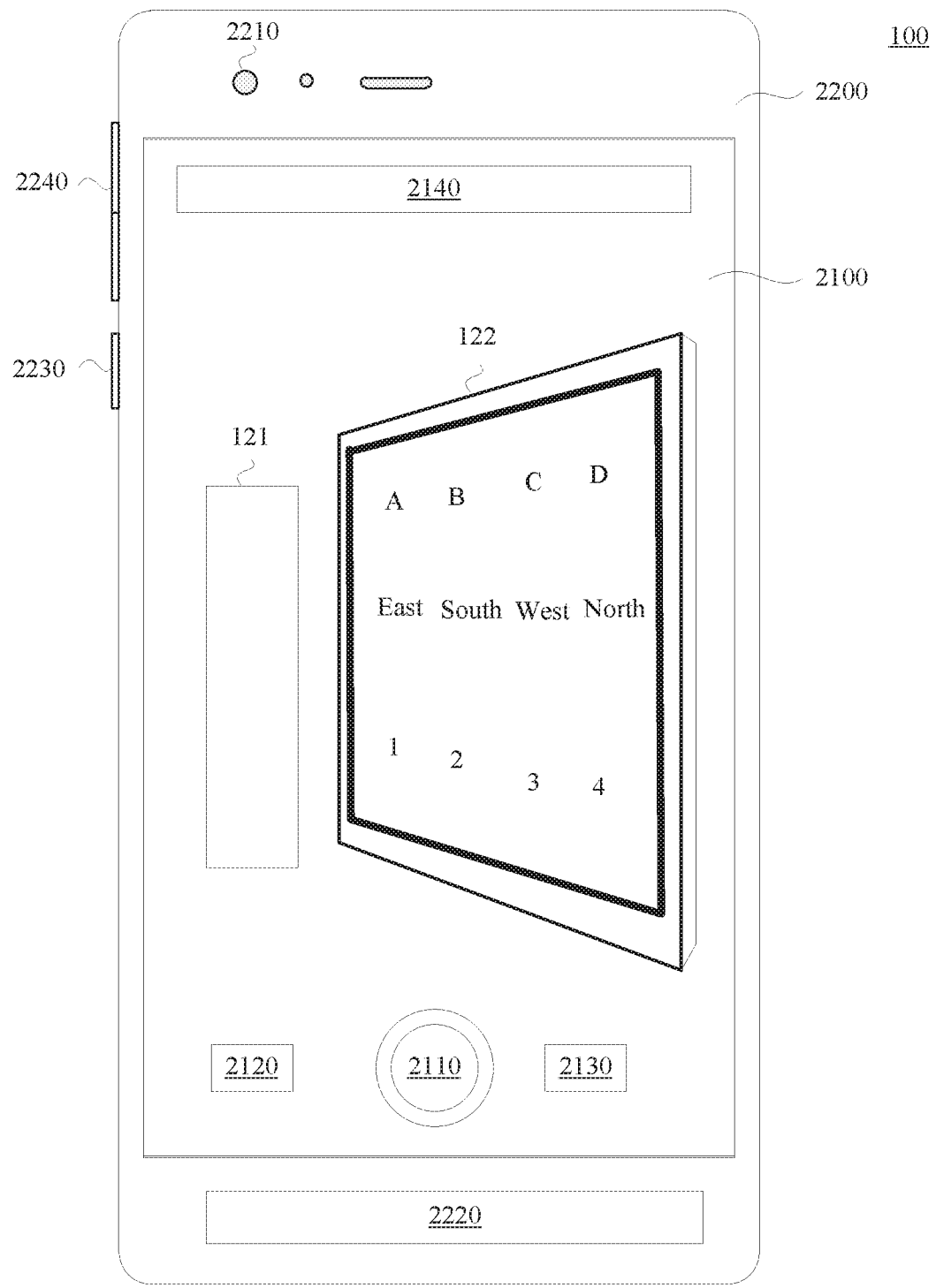
FIG. 11 shows a photographing device displaying a user interface.

It is determined through the foregoing selection that a combination of the first edge line segments 905 to 908 is an optimal combination, and may be prominently displayed on a photographing preview interface (through highlighting and blinking). As shown in FIG. 11, FIG. 11 shows a photographing device 100 displaying a user interface. The photographing device 100 may include a housing 2200 and a display screen 2100. The display screen 2100 may be a touchscreen. The housing 2200 includes a camera lens 2210, and the camera lens 2210 may be a front-facing camera lens. The housing 2200 may further include a rear-facing camera lens, and may include two rear-facing camera lenses (a binocular camera). The touchscreen 2100 may be an integration of a touch panel and a display panel, to implement input and output functions of a mobile phone 2000. In this implementation of the present invention, the user interface includes a status bar region 2140, and functional buttons 2110, 2120, and 2130. The functional button 2110 may control photographing, the functional button 2120 may start an album, and the functional button 2120 may control switching between camera lenses. In this process, the touchscreen 2100 is used both as the input unit 160 and the display unit 130 that are shown in FIG. 1.

The status bar region 2140 displays one or more pieces of information such as an operator name (for example, China Mobile or China Unicom), a Wi-Fi (Wireless-Fidelity, Wireless Fidelity) status control identifier, a mobile communication signal status control identifier, a battery level status control identifier, and a local time; or may display flash status switching, resolution status (HQ) switching, and the like.

Figure 12:
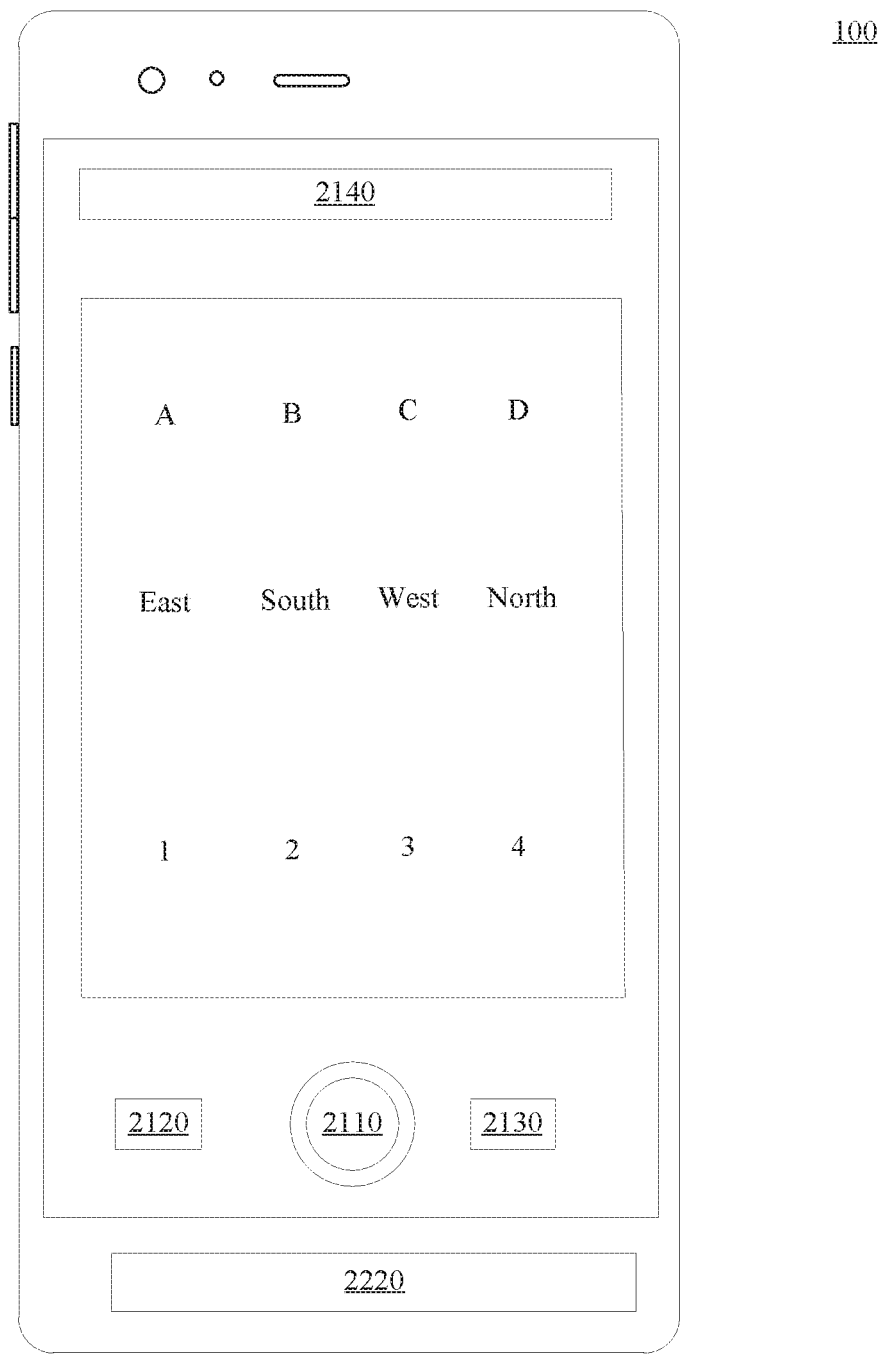
FIG. 12 shows another photographing device displaying a user interface.

A user may confirm, based on a prompt on the user interface on the display screen, whether to perform correction. After the user confirms to perform the correction, a user interface on the photographing device 100 that is shown in FIG. 12 may be obtained. The user may further perform a save operation.

It should be noted that, when it is confirmed whether to perform the correction, if an instruction indicating that recognition is incorrect is received, detection may be re-performed. Alternatively, the combinations of the first edge line segments may be sorted during detection, and may be sequentially displayed on the user interface according to a user instruction.

In addition, a user instruction may also be added, to assist in rectangular region detection. For example, the user may touch the display screen, to select a surface of a rectangular region that needs to be detected. The photographing device 100 collects a touch point of the user, and uses the touch point as a third feature point. In addition, during the screening, the region formed by the combination of the first edge line segments needs to include the third feature point. To improve user experience, a quantity of last user touch points, for example, last two touch points, may be selected. Alternatively, the photographing device 100 collects a touch point of the user, and determines a first edge line segment on which the touch point is located. In addition, during the screening, the combination of the first edge line segments needs to include the first edge line segment on which the touch point is located. Certainly, a manner of excluding a user touch point may alternatively be used.

It should be noted that the foregoing scenario described with reference to FIG. 8 is merely a simplified scenario. The present invention is also applicable to a more complex scenario in reality.

Figure 13:
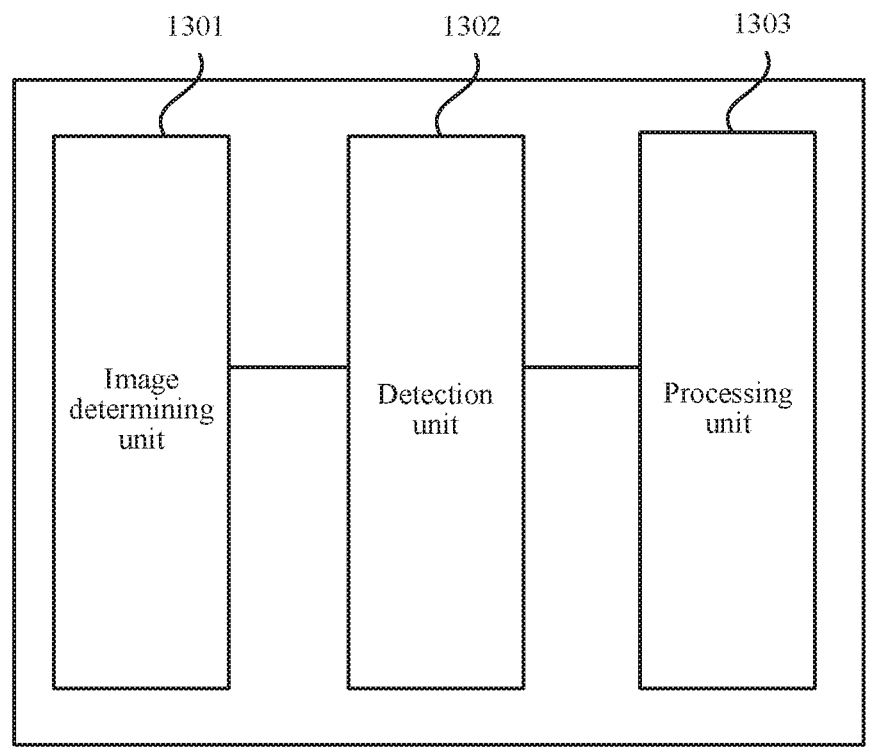
FIG. 13 is a schematic structural diagram of a rectangular region detection apparatus according to an embodiment of the present invention.

FIG. 13 is a schematic structural diagram of a rectangular region detection apparatus according to an embodiment of the present invention. As shown in FIG. 13, the apparatus includes: an image determining unit 1301, configured to determine to-be-processed image information, where the to-be-processed image information includes at least two images, and the at least two images include a same plurality of first feature points:

a detection unit 1302, configured to detect a plurality of first edge line segments in one of the at least two images; and a processing unit 1303, configured to determine four first edge line segments in the plurality of first edge line segments.

The processing unit 1303 is further configured to determine, based on location information of a plurality of first feature points in a region formed by the four first edge line segments in the at least two images, locations of photographed points corresponding to the plurality of first feature points in the region.

The processing unit 1303 is further configured to determine, when the photographed points corresponding to the plurality of first feature points in the region are coplanar, that the region is a rectangular region.

Optionally, the processing unit 1303 is further configured to calculate, based on two-dimensional coordinates of the plurality of first feature points in the region in the at least two images, coordinates of second feature points corresponding to the plurality of first feature points in a first three-dimensional coordinate system.

Optionally, the processing unit 1303 is further configured to construct a second three-dimensional coordinate system based on the coordinates of the plurality of second feature points in the first three-dimensional coordinate system, and calculate coordinates of the plurality of second feature points in the second three-dimensional coordinate system and calculate a transformation matrix from a two-dimensional coordinate system of an image plane of the one of the at least two images to the second three-dimensional coordinate system. Two of three coordinate axes of the second three-dimensional coordinate system are coplanar with the plurality of second feature points. Alternatively, a plane defined by two of three coordinate axes of the second three-dimensional coordinate system is parallel to a plane defined by the plurality of second feature points.

The processing unit 1303 is further configured to calculate, based on the transformation matrix, four second edge line segments in the second three-dimensional coordinate system that correspond to the four first edge line segments.

The processing unit 1303 is further configured to determine, when a shape formed by the four second edge lines is a rectangle, that the region is a rectangular region.

Optionally, the plurality of first feature points in the region formed by the four first edge line segments include four vertexes of a quadrangle formed by the four first edge line segments.

Figure 14:
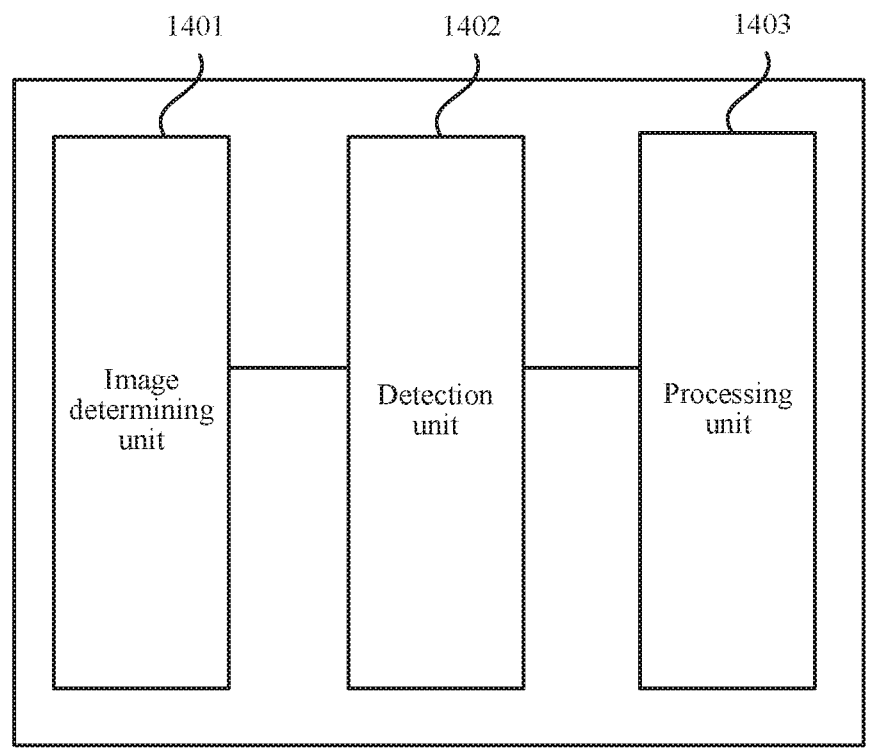
FIG. 14 is a schematic structural diagram of an image processing apparatus according to an embodiment of the present invention.

FIG. 14 is a schematic structural diagram of an image processing apparatus according to an embodiment of the present invention. As shown in FIG. 14, the apparatus includes:

an image determining unit 1401, configured to determine a to-be-processed image, where the to-be-processed image includes at least two images, and the at least two images include a same plurality of first feature points:

a detection unit 1402, configured to detect a plurality of first edge line segments in one of the at least two images: and a processing unit 1403, configured to select four first edge line segments satisfying a preset rule from the one of the at least two images, and calculate, based on two-dimensional coordinates of a plurality of first feature points in a region formed by the four first edge line segments in each of the at least two images, coordinates of second feature points corresponding to the first feature points in the region in a first three-dimensional coordinate system.

The processing unit 1403 is further configured to construct a second three-dimensional coordinate system based on the coordinates of the plurality of second feature points, and calculate coordinates of the plurality of second feature points in the second three-dimensional coordinate system and calculate a transformation matrix from a two-dimensional coordinate system of an image plane of the one of the at least two images to the second three-dimensional coordinate system. Two of three coordinate axes of the second three-dimensional coordinate system are coplanar with the plurality of second feature points. Alternatively, a plane defined by two of three coordinate axes of the second three-dimensional coordinate system is parallel to a plane defined by the plurality of second feature points.

The processing unit 1403 is further configured to calculate, based on the transformation matrix, four second edge line segments in the second three-dimensional coordinate system that correspond to the four first edge line segments.

The processing unit 1403 is further configured to correct one of the at least two images when a shape formed by the four second edge lines is a rectangle.

Optionally, the processing unit 1403 is further configured to correct one of the at least two images based on an aspect ratio of the shape formed by the four second edge line segments.

Optionally, the shape formed by the four second edge line segments is a rectangle when one or more of the following conditions are satisfied:

an angle between directions of two opposite edge line segments in the four second edge line segments is less than a first threshold;

a distance between two opposite edge line segments in the four second edge line segments needs to be greater than a second threshold;

an angle between two neighboring edge line segments in the four second edge line segments is less than a third threshold;

a perimeter or an area of a region formed by the four second edge line segments is greater than a fourth threshold; and the plurality of second feature points are coplanar.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

A person of ordinary skill in the art may understand that all or some of the steps in each of the foregoing method of the embodiments may be implemented by a program instructing a processor. The foregoing program may be stored in a computer readable storage medium. The storage medium may be a non-transitory (non-transitory) medium, such as a random access memory, read-only memory, a flash memory, a hard disk, a solid state drive, a magnetic tape (English: magnetic tape), a floppy disk (English: floppy disk), an optical disc (English: optical disc), or any combination thereof.

The foregoing descriptions are merely examples of implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A rectangular region detection method, comprising:
    determining to-be-processed image information, wherein the to-be-processed image information comprises at least two images, and wherein the at least two images comprise a same plurality of first feature points;
    detecting a plurality of first edge line segments in one of the at least two images;
    determining four first edge line segments from the plurality of first edge line segments;
    selecting locations of photographed points corresponding to the plurality of first feature points in a region formed by the four first edge line segments, wherein selecting the location of photographed points is based on location information of the plurality of first feature points; and
    determining, that the region is a rectangular region when the photographed points corresponding to the plurality of first feature points in the region are coplanar.

2. The method of claim 1, wherein selecting the locations of photographed points corresponding to the plurality of first feature points in the region comprises: calculating coordinates of second feature points corresponding to the first feature points in a first three-dimensional coordinate system based on two-dimensional coordinates of the plurality of first feature points in the region.

3. The method of claim 2, wherein before the determining that the region is a rectangular region, the method further comprises:
    constructing a second three-dimensional coordinate system based on the coordinates of the plurality of second feature points in the first three-dimensional coordinate system;
    calculating coordinates of the plurality of second feature points in the second three-dimensional coordinate systems;
    calculating a transformation matrix from a two-dimensional coordinate system of an image plane of the one of the at least two images to the second three-dimensional coordinate system;
    calculating four second edge line segments in the second three-dimensional coordinate system that correspond to the four first edge line segments, wherein the calculating the four second edged line segments is based on the transformation matrix; and
    determining that the region is a rectangular region when a shape formed by the four second edge line segments is a rectangle.

4. The method of claim 3, wherein two of three coordinate axes of the second three-dimensional coordinate system are coplanar with the plurality of second feature points.

5. The method of claim 3, wherein a plane defined by two of three coordinate axes of the second three-dimensional coordinate system is parallel to a plane defined by the plurality of second feature points.

6. The method of claim 1, wherein the plurality of first feature points in the region comprise four vertexes of a quadrangle formed by the four first edge line segments.

7. The method of claim 1, wherein the first feature points are described using a feature descriptor calculated by using a point in a surrounding region.

8. An image processing method, comprising:
    determining a to-be-processed image, wherein the to-be-processed image comprises at least two images, and wherein the at least two images comprise a same plurality of first feature points;
    detecting a plurality of first edge line segments in one of the at least two images;

selecting four first edge line segments satisfying a preset rule from the one of the at least two images;

calculating coordinates of second feature points corresponding to the first feature points in a region in a first three-dimensional coordinate system, wherein the region is formed by the four first edge line segments in the at least two images, and wherein the coordinates of the second feature points are calculated based on two-dimensional coordinates of the plurality of first feature points in the region;

constructing a second three-dimensional coordinate system based on the coordinates of the plurality of second feature points;

calculating coordinates of the plurality of second feature points in the second three-dimensional coordinate system;

calculating a transformation matrix from a two-dimensional coordinate system of an image plane of the one of the at least two images to the second three-dimensional coordinate system;

calculating four second edge line segments in the second three-dimensional coordinate system that correspond to the four first edge line segments, wherein the calculating the four second edged line segments is based on the transformation matrix; and correcting one of the at least two images when a shape formed by the four second edge line segments is a rectangle.

9. The method of claim 8, wherein the correcting one of the at least two images comprises: correcting one of the at least two images based on an aspect ratio of the shape formed by the four second edge line segments.

10. The method of claim 8, wherein the shape formed by the four second edge line segments is a rectangle when one or more of the following conditions are satisfied:
   an angle between directions of two opposite edge line segments in the four second edge line segments is less than a first threshold;
   a distance between two opposite edge line segments in the four second edge line segments is greater than a second threshold;
   an angle between two neighboring edge line segments in the four second edge line segments is less than a third threshold;
   a perimeter or an area of a region formed by the four second edge line segments is greater than a fourth threshold; and
   the second feature points are coplanar.

11. The method of claim 8, wherein two of three coordinate axes of the second three-dimensional coordinate system are coplanar with the plurality of second feature points.

12. The method of claim 8, wherein a plane defined by two of three coordinate axes of the second three-dimensional coordinate system is parallel to a plane defined by the plurality of second feature points.

13. The method of claim 8, wherein the first feature points and the second feature points are described using a feature descriptor calculated by using a point in a surrounding region.

14. A rectangular region detection device, comprising:
   at least one camera lens configured to obtain to-be-processed image information, wherein the to-be-processed image information comprises at least two images, and wherein the at least two images comprise a same plurality of first feature points; and
   a processor configured to:
      detect a plurality of first edge line segments in one of the at least two images;
      determine four first edge line segments from the plurality of first edge line segments;
      determine locations of photographed points corresponding to the plurality of first feature points in a region formed by the four first edge line segments, wherein determining the location of photographed points is based on location information of the plurality of first feature points; and
      determine that the region is a rectangular region when the photographed points corresponding to the plurality of first feature points in the region are coplanar.

15. The device of claim 14, wherein the processor is further configured to calculate coordinates of second feature points corresponding to the plurality of first feature points in a first three-dimensional coordinate system based on two-dimensional coordinates of the plurality of first feature points in the region.

16. The device of claim 15, wherein the processor is further configured to:
   construct a second three-dimensional coordinate system based on the coordinates of the plurality of second feature points in the first three-dimensional coordinate system;
   calculate coordinates of the plurality of second feature points in the second three-dimensional coordinate system;
   calculate a transformation matrix from a two-dimensional coordinate system of an image plane of the one of the at least two images to the second three-dimensional coordinate system;
   calculate four second edge line segments in the second three-dimensional coordinate system that correspond to the four first edge line segments, wherein the calculating the four second edged line segments is based on the transformation matrix; and
   determine that the region is a rectangular region when a shape formed by the four second edge line segments is a rectangle.

17. The device of claim 16, wherein two of three coordinate axes of the second three-dimensional coordinate system are coplanar with the plurality of second feature points.

18. The device of claim 16, wherein a plane defined by two of three coordinate axes of the second three-dimensional coordinate system is parallel to a plane defined by the plurality of second feature points.

19. The device of claim 14, wherein the plurality of first feature points in the region comprise four vertexes of a quadrangle formed by the four first edge line segments.

20. The device of claim 14, wherein the first feature points are described using a feature descriptor calculated by using a point in a surrounding region.

* * * * *